US012563569B2

(12) United States Patent
Noh et al.

(10) Patent No.:  US 12,563,569 B2
(45) **Date of Patent:  *Feb. 24, 2026**

(54) METHOD AND DEVICE FOR PERFORMING UPLINK/DOWNLINK TRANSMISSION IN WIRELESS COMMUNICATION SYSTEM

(71) Applicant: WILUS INSTITUTE OF STANDARDS AND TECHNOLOGY INC., Gyeonggi-do (KR)

(72) Inventors: Minseok Noh, Gyeonggi-do (KR); Kyungjun Choi, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,315

(22) Filed: May 30, 2024

(65) Prior Publication Data

US 2024/0314797 A1    Sep. 19, 2024

Related U.S. Application Data

(63) Continuation of application No. 17/887,354, filed on Aug. 12, 2022, now Pat. No. 12,004,190, which is a
(Continued)

(30) Foreign Application Priority Data

| | | | |
|---|---|---|---|
| Feb. 13, 2020 | (KR) | ........................ | 10-2020-0017681 |
| Apr. 24, 2020 | (KR) | ........................ | 10-2020-0050391 |

(51) Int. Cl.
| | |
|---|---|
| *H04W 72/23* | (2023.01) |
| *H04W 72/21* | (2023.01) |
(Continued)

(52) U.S. Cl.
CPC ........... *H04W 72/23* (2023.01); *H04W 72/21* (2023.01); *H04W 72/53* (2023.01); *H04W 72/56* (2023.01);
(Continued)

(58) Field of Classification Search
CPC ............. H04W 72/14; H04W 72/1278; H04W 72/0493; H04W 72/0453; H04W 72/0413;
(Continued)

(56) References Cited

U.S. PATENT DOCUMENTS

| | | | |
|---|---|---|---|
| 2019/0075589 A1 | 3/2019 | Jeon et al. | |
| 2019/0230706 A1* | 7/2019 | Li ......................... | H04W 88/08 |
(Continued)

FOREIGN PATENT DOCUMENTS

| | | |
|---|---|---|
| CN | 107277923 | 10/2017 |
| CN | 108886818 | 11/2018 |
(Continued)

OTHER PUBLICATIONS

Office Action dated Feb. 6, 2024 for European Patent Application No. 21 753 247.2.
(Continued)

*Primary Examiner* — Bo Hui A Zhu
(74) *Attorney, Agent, or Firm* — WOMBLE BOND DICKINSON (US) LLP

(57) ABSTRACT

A method for receiving downlink transmission by a terminal comprises the steps of: performing uplink transmission, which is related to channel occupancy shared between a base station and the terminal, to the base station; and receiving, from the base station, downlink transmission performed after a gap from a time point at which the base station has received the uplink transmission, wherein the downlink transmission is performed on the basis of channel access performed by the base station, the channel access is per-
(Continued)

formed on the basis of the gap, and information included in the downlink transmission and a resource through which the downlink transmission is performed are determined on the basis of whether the base station has configured, for the terminal, a threshold value of energy detection for the channel occupancy.

12 Claims, 16 Drawing Sheets

Related U.S. Application Data continuation of application No. PCT/KR2021/001930, filed on Feb. 15, 2021.

(51) Int. Cl.
| | |
|---|---|
| *H04W 72/53* | (2023.01) |
| *H04W 72/56* | (2023.01) |
| *H04W 74/0808* | (2024.01) |
| *H04W 74/0833* | (2024.01) |

(52) U.S. Cl.
CPC .... *H04W 74/0808* (2013.01); *H04W 74/0833* (2013.01)

(58) Field of Classification Search
CPC ............. H04W 74/08; H04W 74/0808; H04W 74/0833
See application file for complete search history.

(56) References Cited

U.S. PATENT DOCUMENTS

| | | | |
|---|---|---|---|
| 2019/0342911 A1 | 11/2019 | Talarico et al. | |
| 2020/0314842 A1* | 10/2020 | Bhattad ................. | H04L 1/1864 |
| 2020/0359411 A1 | 11/2020 | Li et al. | |
| 2021/0007149 A1 | 1/2021 | Li et al. | |
| 2022/0070922 A1 | 3/2022 | Talarico et al. | |
| 2022/0174741 A1 | 6/2022 | Myung et al. | |

FOREIGN PATENT DOCUMENTS

| | | |
|---|---|---|
| CN | 110035543 | 7/2019 |
| CN | 110574465 | 12/2019 |
| EP | 4057763 A1 | 9/2022 |
| EP | 4 106 473 | 12/2022 |
| JP | 2023501985 A | 1/2023 |
| WO | 2021035502 A1 | 3/2021 |
| WO | 2021091300 A1 | 5/2021 |
| WO | 2021/162534 | 8/2021 |
| WO | 2021162534 A2 | 8/2021 |

OTHER PUBLICATIONS

Office Action dated Oct. 2, 2023 for Japanese Patent Application No. 2022-549009 and its English translation provided by the Applicant's foreign counsel.

Qualcomm Incorporated: "Channel access procedures for NR unlicensed", 3GPP TSG RAN WG1 Meeting #99, R1-1912938, Reno, USA, Nov. 18-22, 2019, pp. 1-18.

Extended European Search Report dated Jun. 14, 2023 for European Patent Application No. 21753247.2.

Nokia, Nokia Shanghai Bell: "Feature Lead's Summary on Channel Access Procedures", 3GPP TSG RAN WG1 Meeting #99, R1-1912258, Reno, US, Nov. 18-22, 2019, 99. 1-26.

3GPP TS 38.300 V15.8.0: "3rd Generation Partnership Project; Technical Specification Group Radio Access Network; NR; NR and NG-RAN Overall Description; Stage 2 (Release 15)", Jan. 8, 2020, pp. 1-99.

Office Action dated Feb. 2, 2023 for Indian Patent Application No. 202227052115.

International Search Report for PCT/KR2021/001930 mailed on Jun. 15, 2021 and its English translation from WIPO (now published as WO 2021/162534).

Written Opinion of the International Searching Authority for PCT/KR2021/001930 mailed on Jun. 15, 2021 and its English translation by Google translate (now published as WO 2021/162534).

3GPP TS 37.213 V16.0.0: "3rd Generation Partnership Project; Technical Specification Group Radio Access Network; Physical layer procedures for shared spectrum channel access (Release 16)", Jan. 14, 2020, pp. 1-25.

LG Electronics: "Channel access procedure for NR-US", 3GPP TSG RAN WG1 Meeting #99, R1-1912389, Reno, USA, Nov. 18-22, 2019, pp. 1-19.

Huawei, HiSilicon: "Coexistence and channel access for NR unlicensed band operations", 3GPP TSG RAN WG1 Meeting #99, R1-1911866, Reno, USA, Nov. 18-22, 2019, pp. 1-18.

WILUS Inc.: "Channel access procedure for NR-U" m 3GPP TSG RAN WG1 #99, R1-1913064, Reno, USA, Nov. 18-22, 2019, pp. 1-8.

Nokia, Nokia Shanghai Bell: "Feature Lead's Summary #2 on Channel Access Procedures", 3GPP TSG RAN WG1 Meeting #99, R1-1913517, Reno, USA Nov. 18-22, pp. 1-28.

Notice of Allowance dated Jul. 9, 2024 for European Patent Application No. 21 753 247.2.

Hearing Notice dated Jul. 26, 2024 for Indian Patent Application No. 202227052115.

Notice of Allowance dated Jan. 24, 2024 for U.S. Appl. No. 17/887,354 (now published as US 2022/0394755).

Office Action dated Sep. 22, 2023 for U.S. Appl. No. 17/887,354 (now published as US 2022/0394755).

Final Office Action dated Apr. 11, 2023 for U.S. Appl. No. 17/887,354 (now published as US 2022/0394755).

Office Action dated Jan. 3, 2023 for U.S. Appl. No. 17/887,354 (now published as US 2022/0394755).

Extended European Search Report dated Dec. 3, 2024 for European Patent Application No. 24212664.7.

Extended European Search Report dated Nov. 29, 2024 for European Patent Application No. 24212759.5.

Notice of Allowance ($2^{nd}$) dated Dec. 2, 2024 for European Patent Application No. 21 753 247.2.

Office Action (1st) dated Jan. 31, 2025 for Korean Patent Application No. 10-2022-7027911 and its English translation provided by Applicant's foreign counsel.

Office Action (1st) dated Feb. 13, 2025 for Chinese Patent Application No. 202180021820.7 and its English translation provided by Applicant's foreign counsel.

Office Action (1st) dated May 21, 2025 for U.S. Appl. No. 18/680,785.

Office Action (1st) dated Jun. 17, 2025 for Japanese Patent Application No. 2024-083685 and its English translation provided by Applicant's foreign counsel.

Office Action (1st) dated Jun. 17, 2025 for Japanese Patent Application No. 2024-083684 and its English translation provided by Applicant's foreign counsel.

Notice of Allowance dated Jul. 11, 2025 for Vietnamese Patent Application No. 1-2022-05844 and its English translation provided by Applicant's foreign counsel.

Notice of Allowance dated Sep. 16, 2025 for Chinese Patent Application No. 202180021820.7 and its English translation provided by Applicant's foreign counsel/Google Translate.

Office Action (2nd) dated Nov. 18, 2025 for Japanese Patent Application No. 2024-083684 and its English translation provided by Applicant's foreign counsel.

\* cited by examiner 1 radio frame, $T_f = (\Delta f_{max} N_f / 100) \cdot T_c = 10\,\text{ms}$ 1 sub-frame, $T_{sf} = (\Delta f_{max} N_f / 1000) \cdot T_c = 1\,\text{ms}$

| #0 | #1 | #2 | #3 | ... | #8 | #9 |

| slot#0 | slot#1 | slot#2 | slot#3 | ... | #slot#$(2^\mu-2)$ | slot#$(2^\mu-1)$ |

1 slot, $T_{slot} = (\Delta f_{max} N_f / 1000) \cdot T_c \cdot 2^{-\mu} = 2^{-\mu}\,\text{ms}$ (a) Single CC                    (b) Multiple CC

*Fig. 11*

METHOD AND DEVICE FOR PERFORMING UPLINK/DOWNLINK TRANSMISSION IN WIRELESS COMMUNICATION SYSTEM

CROSS-REFERENCE TO RELATED APPLICATIONS

This application is a continuation of pending PCT International Application No. PCT/KR2021/001930, which was filed on Feb. 15, 2022, which claims priority under 35 U.S.C 119(a) to Korean Patent Application No. 10-2020-0017681 filed with the Korean Intellectual Property Office on Feb. 13, 2020, and Korean Patent Application No. 10-2020-0050391 filed with the Korean Intellectual Property Office on Apr. 24, 2020. The disclosures of the above patent applications are incorporated herein by reference in their entirety.

TECHNICAL FIELD

The present specification relates to a wireless communication system, particularly to a method and device for performing uplink/downlink transmission.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mm Wave band, in 5G communication systems, beamforming, massive multiple input/output (massive MIMO), full dimensional MIMO (FD-MIMO), array antenna, analog beamforming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

In recent years, with the explosion of mobile traffic due to the spread of smart devices, it is becoming difficult to cope with the increasing data usage for providing cellular communication services using only the existing licensed frequency spectrums or licensed frequency bands.

In such a situation, a method of using an unlicensed frequency spectrum or an unlicensed frequency band (e.g., 2.4 GHz band, 5 GHz band or higher band, or the like) for providing cellular communication services is being discussed as a solution to the problem of lack of spectrum.

Unlike in licensed bands in which telecommunications carriers secure exclusive use rights through procedures such as auctions, in unlicensed bands, multiple communication devices may be used simultaneously without restrictions on the condition that only a certain level of adjacent band protection regulations are observed. For this reason, when an unlicensed band is used for cellular communication service, it is difficult to guarantee the communication quality to the level provided in the licensed band, and it is likely that interference with existing wireless communication devices (e.g., wireless LAN devices) using the unlicensed band occurs.

In order to use LTE and NR technologies in unlicensed bands, research on coexistence with existing devices for unlicensed bands and efficient sharing of wireless channels is to be conducted in advance. That is, it is required to develop a robust coexistence mechanism (RCM) such that devices using LTE and NR technologies in the unlicensed band do not affect the existing devices for unlicensed bands.

DISCLOSURE OF THE INVENTION

Technical Problem

An object of the present specification is to provide a method for performing uplink/downlink transmission according to sharing of channel occupancy initiated by a user equipment in a wireless communication system.

Technical Solution

The present specification provides a method for receiving downlink transmission in a wireless communication system.

In detail, a method performed by a user equipment includes: performing, to a base station, uplink transmission related to channel occupancy shared between the base station and the user equipment; and receiving, from the base station, downlink transmission performed by the base station after a gap from a time of reception of the uplink transmission by the base station, wherein the downlink transmission is performed based on channel access performed by the base station, the channel access is performed based on the gap, and information included in the downlink transmission and a resource on which the downlink transmission is performed are determined based on whether the user equipment has received, from the base station, a configuration of a threshold of energy detection for the channel occupancy.

The gap is less than 16 μs, 16 μs, or 25 μs.

When the gap is less than 16 μs, the channel access is channel access that allows the downlink transmission to be performed without performing channel sensing, when the gap is 16 μs, the gap includes one sensing slot within last 9 μs, and the channel access is channel access that allows the downlink transmission to be performed when the sensing slot is idle, and when the gap is 25 μs, the gap is configured with a first interval of a length of 16 μs including a first sensing slot of a length of 9 μs and a second interval of a length of 9 μs that is a second sensing slot, and the channel access is channel access that allows the downlink transmission to be performed when the first sensing slot and the second sensing slot are idle.

When the user equipment receives the configuration of the threshold of energy detection for the channel occupancy from the base station, the information included in the downlink transmission includes at least one of unicast transmission for the user equipment or non-unicast transmission.

When the user equipment does not receive the configuration of the threshold of energy detection for the channel occupancy from the base station, the information included in the downlink transmission excludes unicast transmission, and a maximum number of symbols of a resource on which the downlink transmission is performed within the channel occupancy interval is any one of 2, 4, and 8.

When a subcarrier spacing (SCS) is 15 KHz, the resource on which the downlink transmission is performed within the channel occupancy interval includes up to two symbols, when the SCS is 30 KHz, the resource on which the downlink transmission is performed within the channel occupancy interval includes up to four symbols, and when the SCS is 60 KHz, the resource on which the downlink transmission is performed within the channel occupancy interval includes up to eight symbols.

The uplink transmission is configured grant (CG)-physical uplink shared channel (PUSCH) performed on a resource pre-configured semi-statically from the base station.

The method further includes, when the user equipment receives, from the base station, the configuration of the threshold of energy detection for the channel occupancy, receiving, from the base station, a configuration of information about a table including values set for each of one or more parameters for the channel occupancy and one or more indices corresponding to the set values, wherein the CG-PUSCH includes CG-uplink control information (UCI) including information indicating a first index among the one or more indices, and the downlink transmission is performed based on the values set for each of the one or more parameters corresponding to the first index.

The one or more parameters include at least one of channel access priority (CAPC), duration, or offset, wherein the CAPC is one used in the channel occupancy, the duration is the number of slots in which the downlink transmission is performed, and the offset is a difference from an end of a slot in which the base station detects the CG-UCI to a slot in which the downlink transmission is started.

The method further includes, when the user equipment does not receive the configuration of the threshold of energy detection for the channel occupancy from the base station, receiving, from the base station, an offset for indicating a resource that is available for the downlink transmission, wherein the CG-PUSCH includes CG-UCI including information indicating that the channel occupancy is possible, and the downlink transmission is performed on resources between a last resource of a slot in which the base station detects the CG-UCI and a resource spaced apart therefrom by as much as the offset.

The information included in the downlink transmission excludes unicast transmission, and a maximum number of symbols of the resource on which the downlink transmission is performed within the channel occupancy interval is any one of 2, 4, and 8.

When a subcarrier spacing (SCS) is 15 KHz, the resource on which the downlink transmission is performed within the channel occupancy interval includes up to two symbols, when the SCS is 30 KHz, the resource on which the downlink transmission is performed within the channel occupancy interval includes up to four symbols, and when the SCS is 60 KHz, the resource on which the downlink transmission is performed within the channel occupancy interval includes up to eight symbols.

Furthermore, in the present specification, a method for performing uplink transmission in a wireless communication system, which is performed by a user equipment, includes: performing first transmission that is configured grant (CG) uplink transmission to a base station on a first resource, wherein the CG uplink transmission is transmission performed on a resource pre-configured semi-statically from the base station; and performing second transmission that is scheduled uplink transmission to the base station on a second resource, wherein the first resource and the second resource are continuous to each other in a time domain, when at least one pre-configured condition is satisfied, the second transmission is performed on the second resource immediately after a last symbol of the first resource, and when the at least one pre-configured condition is not satisfied, the first transmission is dropped at the last symbol of the first resource.

One of the at least one pre-configured condition is a condition that the first transmission be performed based on channel access in which random backoff is performed using a contention window (CW) of a variable size.

One of the at least one pre-configured condition is a condition that a resource allocated for the second transmission occupy all resource blocks (RBs) of the same frequency domain as a frequency domain of a resource allocated for the first transmission.

One of the at least one pre-configured condition is a condition that when a bandwidth part (BWP) that is a resource in a frequency domain allocated for the first transmission is configured with a plurality of listen before talk (LBT) bandwidth subsets, a resource allocated for the second transmission occupy all resource blocks (RBs) included in at least one of the plurality of LBT bandwidth subsets.

One of the at least one pre-configured condition is a condition that the second transmission be performed based on a second channel access priority class (CAPC) value that is smaller than or equal to a first CAPC value used in the channel access.

One of the at least one pre-configured condition is a condition that a sum of a time domain of the first resource and a time domain of the second resource not exceed a maximum channel occupancy time (MCOT) corresponding to the first CAPC value.

Furthermore, in the present specification, a user equipment for receiving downlink transmission in a wireless communication system includes: a communication module; and a processor that controls the communication processor, wherein the processor performs uplink transmission to a base station, the uplink transmission being related to channel occupancy shared between the base station and the user equipment, and receives, from the base station, downlink transmission performed by the base station after a gap from a time of reception of the uplink transmission by the base station, wherein the downlink transmission is performed based on channel access performed by the base station, the channel access is performed based on the gap, and information included in the downlink transmission and a resource on which the downlink transmission is performed are determined based on whether the user equipment receives a configuration of a threshold of energy detection for the channel occupancy from the base station.

When the user equipment receives the configuration of the threshold of energy detection for the channel occupancy from the base station, the information included in the downlink transmission includes at least one of unicast transmission for the user equipment or non-unicast transmission, and when the user equipment does not receive, the configuration of the threshold of energy detection for the channel occupancy from the base station, the information included in the downlink transmission excludes unicast transmission, and a maximum number of symbols of a resource on which the downlink transmission is performed within the channel occupancy interval is any one of 2, 4, and 8.

Advantageous Effects

The present specification provides a method for performing a channel access procedure based on a gap for downlink transmission when an occupied channel initiated by a user equipment is shared in a wireless communication system, and thus downlink transmission can be performed efficiently.

The present specification provides a method for performing uplink transmission when an occupied channel initiated by a user equipment is shared in a wireless communication system, and thus uplink transmission can be performed efficiently.

BRIEF DESCRIPTION OF THE DRAWINGS

FIG. 11 is a diagram illustrating a position of an OFDM symbol occupied by SSB within a plurality of slots of a licensed band of an NR system according to an embodiment of the present invention.

MODE FOR CARRYING OUT THE INVENTION

Figure 1:
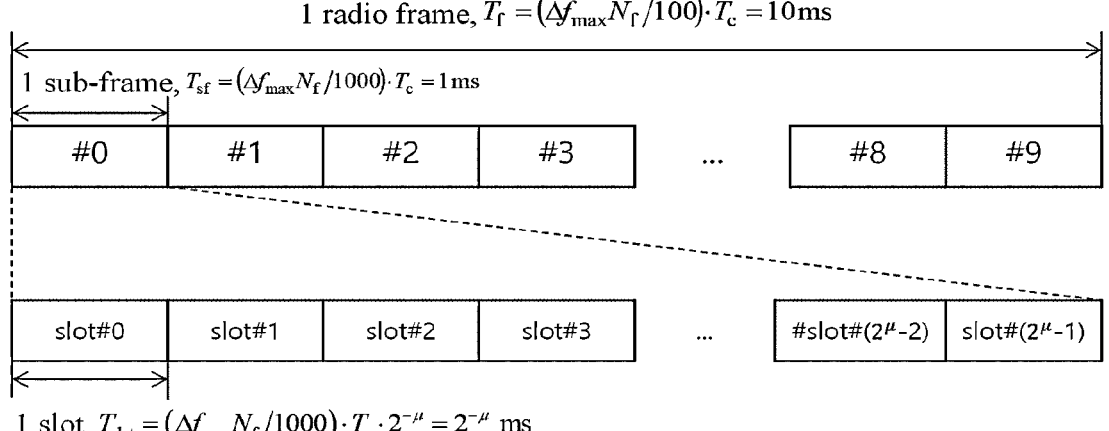
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified in the present specification, a base station may include a next generation node B (gNB) defined in 3GPP NR. In addition, unless otherwise specified, the terminal may include user equipment (UE). Hereinafter, in order to help understanding the description, each content is divided into embodiments and described, but the respective embodiments may be used in combination with each other. In the present disclosure, the configuration of the terminal may indicate configuration by the base station. Specifically, the base station may transmit a channel or signal to the terminal to set an operation of the terminal or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)^*T_c$). In addition, the wireless frame includes 10 subframes (SFs) having equal sizes. Herein, $\Delta f_{max}=480^*10^3$ Hz, $N_f=4096$, $T_c=1/(\Delta f_{ref}^*N_{f,ref})$, $\Delta f_{ref}=15^*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15^*2^\mu$ kHz, and $\mu$ can have a value of $\mu=0, 1, 2, 3, 4$ as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to 24 slots within one wireless frame. In addition, numbers from 0 to $10^*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
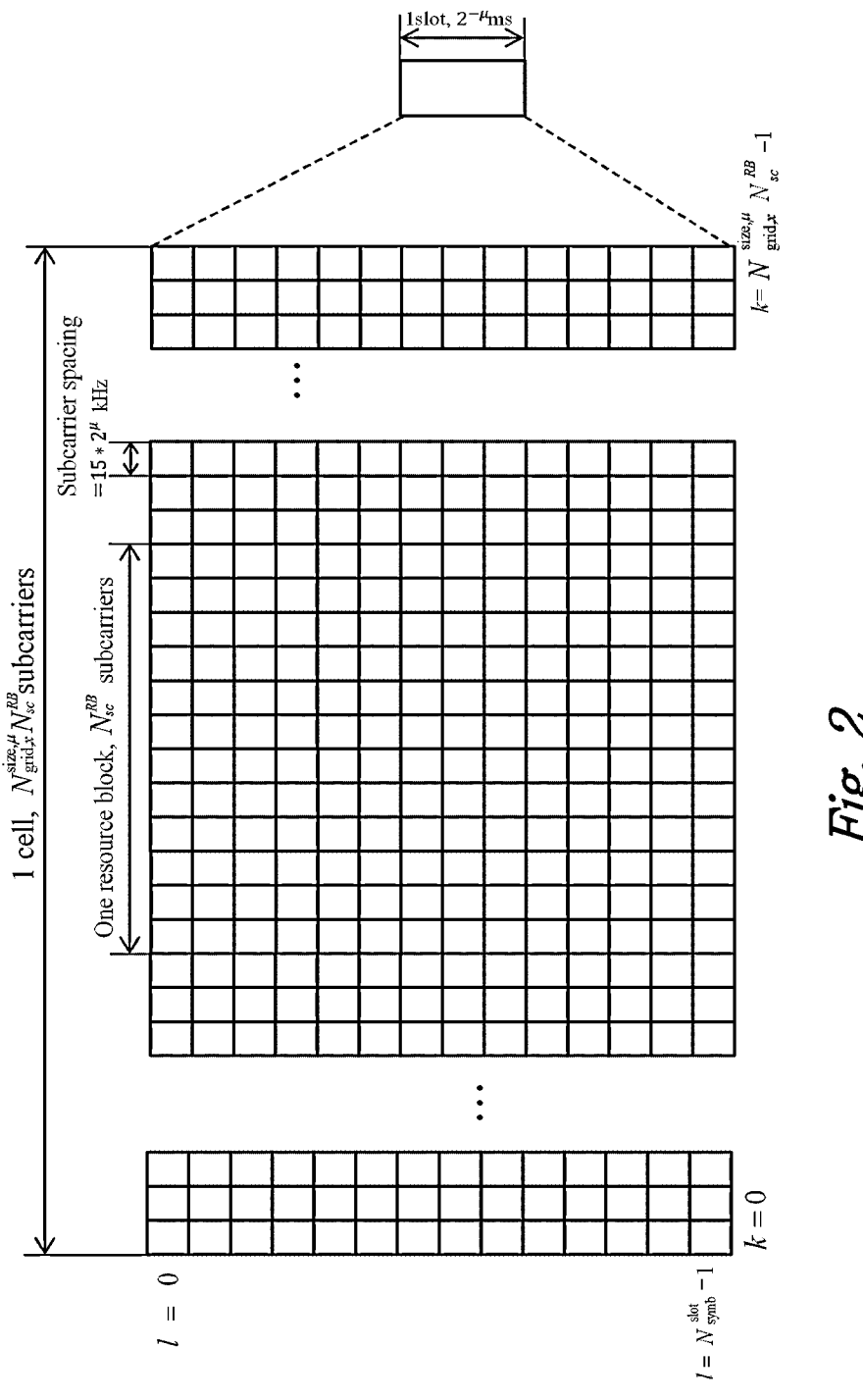
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e.g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

The type of symbol configured with the above RRC signal may be referred to as a semi-static DL/UL configuration. In the semi-static DL/UL configuration previously configured with RRC signals, the flexible symbol may be indicated as a DL symbol, an UL symbol, or a flexible symbol through dynamic slot format information (SFI) transmitted on a physical DL control channel (PDCCH). In this case, the DL symbol or UL symbol configured with the RRC signal is not changed to another symbol type. Table 1 exemplifies the dynamic SFI that the base station can indicate to the UE.

TABLE 1

| index | \multicolumn{14}{c}{Symbol number in a slot} | | | | | | | | | | | | | |
|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | X | X | X | U | D | D | X | X | X | X | U |
| 48 | D | X | U | U | U | U | U | D | X | U | U | U | U | U |
| 49 | D | D | X | X | U | U | U | D | D | X | X | U | U | U |
| 50 | D | X | X | U | U | U | U | D | X | X | U | U | U | U |
| 51 | D | X | U | U | U | U | U | D | X | U | U | U | U | U |
| 52 | D | D | X | X | X | X | U | D | D | X | X | X | X | U |
| 53 | D | D | D | X | X | U | U | D | D | D | X | X | U | U |
| 54 | X | X | X | X | X | X | X | D | D | D | D | D | D | D |
| 55 | D | D | X | X | X | U | U | U | D | D | D | D | D | D |
| 56-255 | Reserved | | | | | | | | | | | | | |

In Table 1, D denotes a DL symbol, U denotes a UL symbol, and X denotes a flexible symbol. As shown in Table 1, up to two DL/UL switching in one slot may be allowed.

Figure 3:
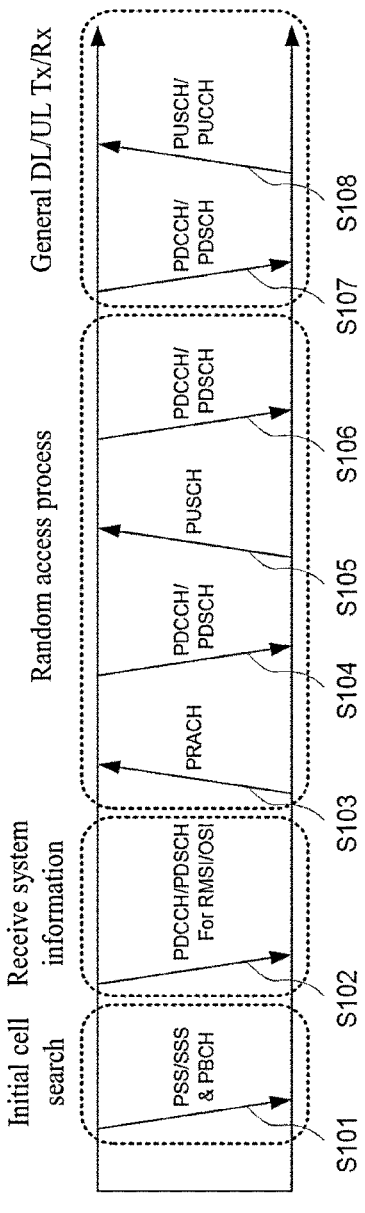
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (step S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (step S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (steps S103 to S106). First, the UE can transmit a preamble through a physical random access channel (PRACH) (step S103) and receive a response message for the preamble from the base station through the PDCCH and the corresponding PDSCH (step S104). When a valid random access response message is received by the UE, the UE transmits data including the identifier of the UE and the like to the base station through a physical uplink shared channel (PUSCH) indicated by the UL grant transmitted through the PDCCH from the base station (step S105). Next, the UE waits for reception of the PDCCH as an indication of the base station for collision resolution. If the UE successfully receives the PDCCH through the identifier of the UE (step S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (step S107) and transmits a physical uplink shared channel (PUSCH)/physical uplink control channel (PUCCH) (step S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and R777I may be included in channel state information (CSI). In the 3GPP NR system, the UE may transmit control information such as HARQ-ACK and CSI described above through the PUSCH and/or PUCCH.

Figure 4:
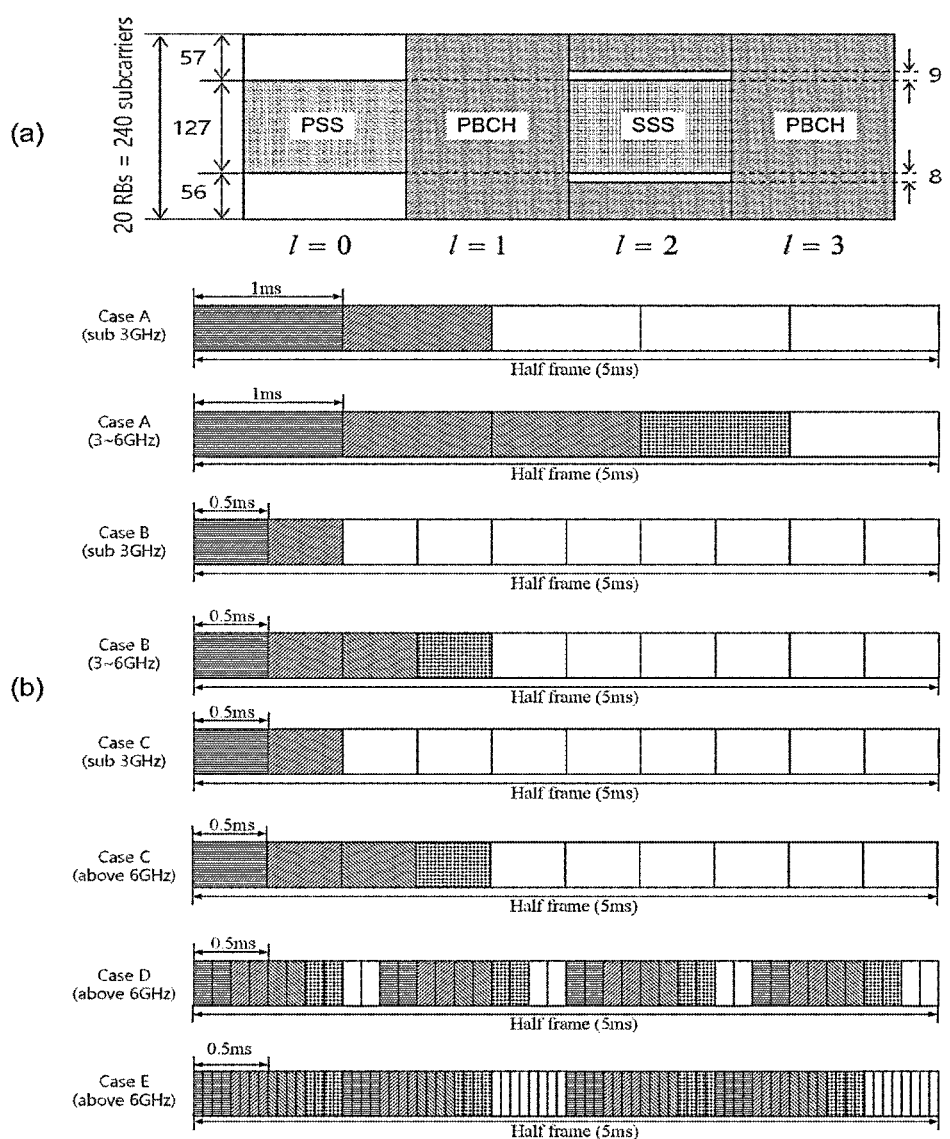
FIG. 4 illustrates an SS/PBCH block for initial cell access in a 3GPP NR system.

FIG. 4 illustrates an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4(a), a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4(a) and Table 2, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 2

| Channel or signal | OFDM symbol number/ relative to the start of an SS/PBCH block | Subcarrier number k relative to the start of an SS/PBCH block |
|---|---|---|
| PSS | 0 | 56, 57, . . . ,182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
|  | 1, 3 | 0, 1, . . . , 239 |
| PBCH | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = \left(n + 43N^{(2)}_{ID}\right) \bmod 127$$

$$0 \le n < 127$$

Here, $x(i+7) = (x(i+4) + x(i)) \bmod 2$ and is given as $$[x(6) \ x(5) \ x(4) \ x(3) \ x(2) \ x(1) \ x(0)] = [1 \ 1 \ 1 \ 0 \ 1 \ 1 \ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N^{(1)}_{ID}}{112} \right\rfloor + 5N^{(2)}_{ID}$$

$$m_1 = N^{(1)}_{ID} \bmod 112$$

$$0 \le n < 127$$

$$x_0(i+7) = (x_0(i+4) + x_0(i)) \bmod 2$$

Here, $x_1(i+7) = (x_1(i+1) + x_1(i)) \bmod 2$ and is given as $$[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$$

$$[x_1(6) \ x_1(5) \ x_1(4) \ x_1(3) \ x_1(2) \ x_1(1) \ x_1(0)] = [0 \ 0 \ 0 \ 0 \ 0 \ 0 \ 1]$$

A radio frame with a 10 ms length may be divided into two half frames with a 5 ms length. Referring to FIG. 4(b), a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
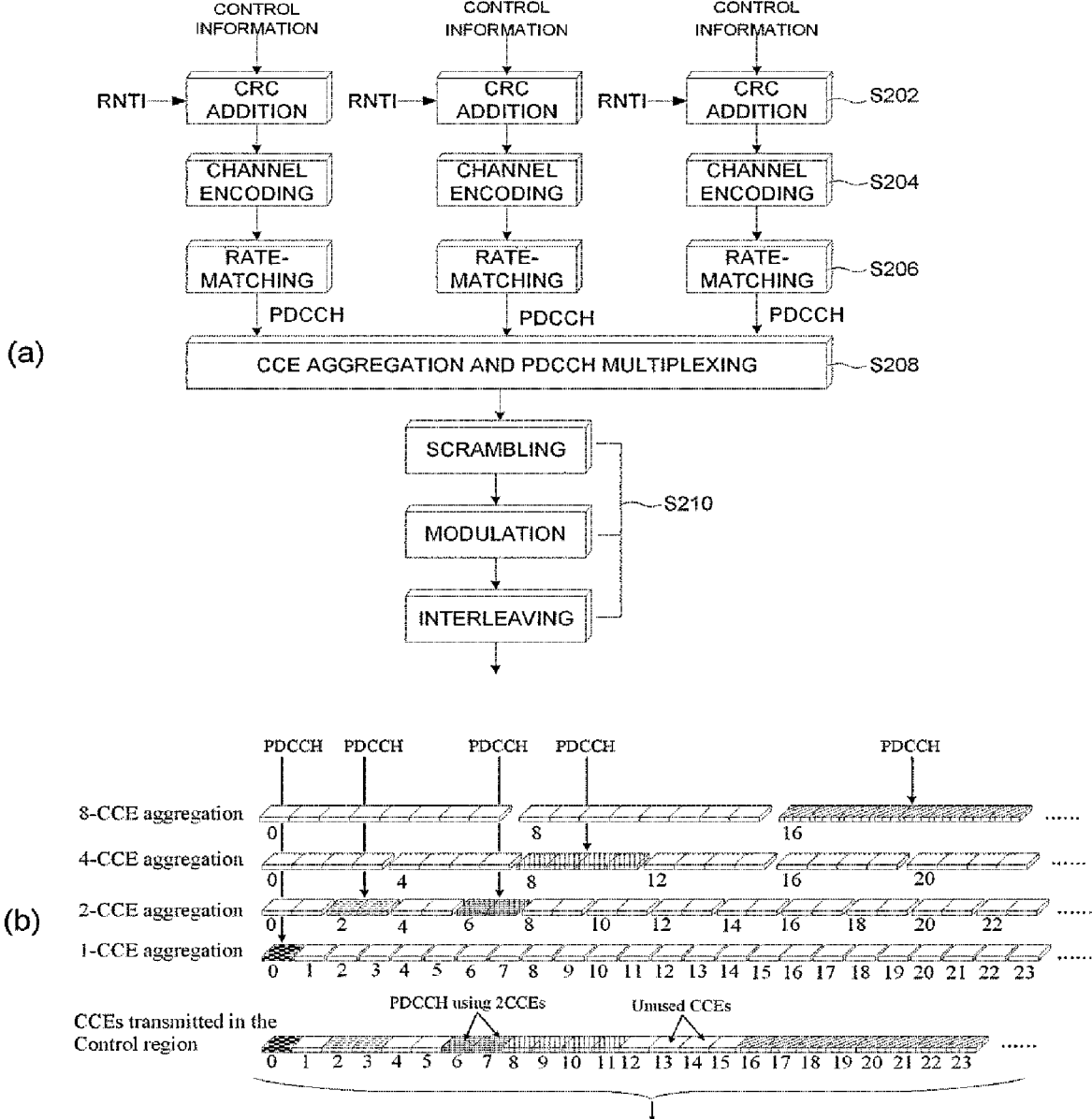
FIG. 5 illustrates a procedure for transmitting control information and a control channel in a 3GPP NR system.

FIG. 5 illustrates a procedure for transmitting control information and a control channel in a 3GPP NR system. Referring to FIG. 5(a), the base station may add a cyclic redundancy check (CRC) masked (e.g., an XOR operation) with a radio network temporary identifier (RNTI) to control information (e.g., downlink control information (DCI)) (step S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (step S206) according to the amount of resource(s) used for PDCCH transmission after performing channel encoding (e.g., polar coding) (step S204). Thereafter, the base station may multiplex the DCI(s) based on the control channel element (CCE) based PDCCH structure (step S208). In addition, the base station may apply an additional process (step S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5(b) is a diagram related to a CCE aggregation level and the multiplexing of a PDCCH and illustrates the type of a CCE aggregation level used for one PDCCH and CCE(s) transmitted in the control area according thereto.

Figure 6:
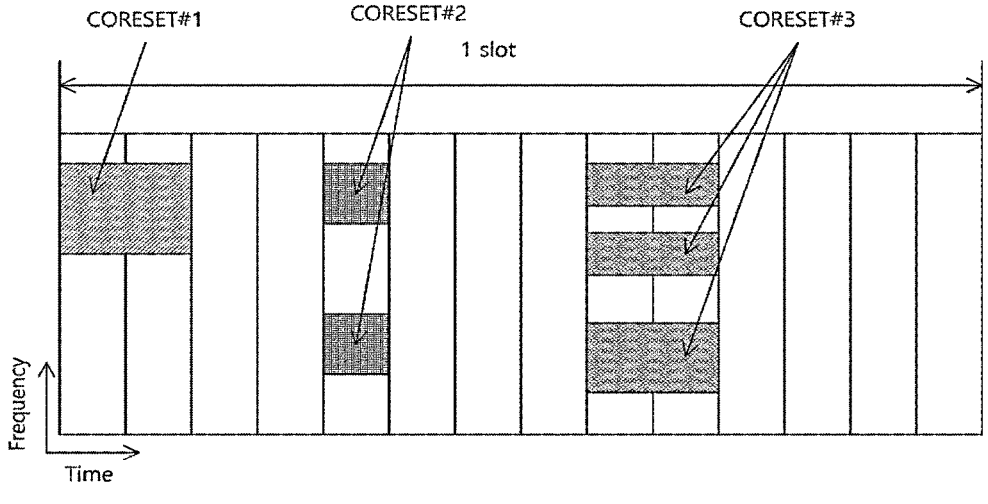
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
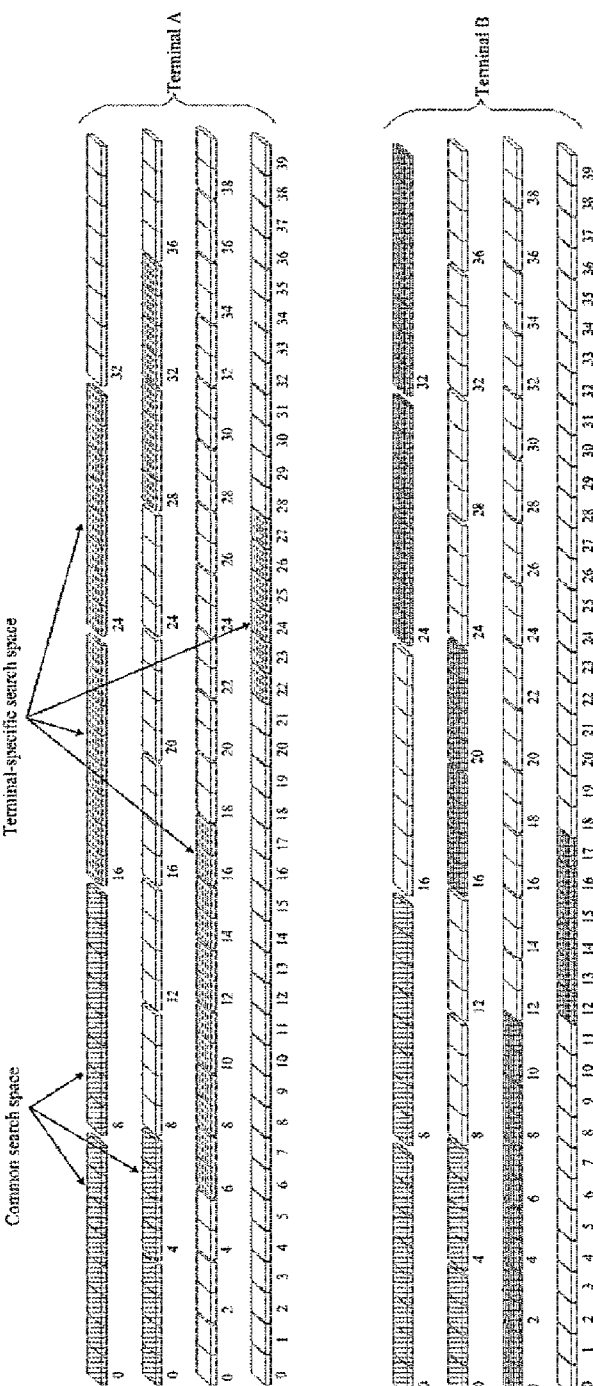
FIG. 7 illustrates a method for configuring a PDCCH search space in a 3GPP NR system.

FIG. 7 illustrates a method for setting a PUCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 3 shows an embodiment of a physical uplink control channel (PUCCH) used in a wireless communication system.

TABLE 3

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information successfully transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}$=1 or 2). In addition, the base sequence having the length of 12 may be transmitted by mapping a cyclic shifted sequence based on a predetermined CS value $m_{cs}$ to one OFDM symbol and 12 REs of one RB. When the number of cyclic shifts available to the UE is 12 and $M_{bit}$=1, 1 bit UCI 0 and 1 may be mapped to two cyclic shifted sequences having a difference of 6 in the cyclic shift value, respectively. In addition, when $M_{bit}$=2, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 maybe transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}$>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
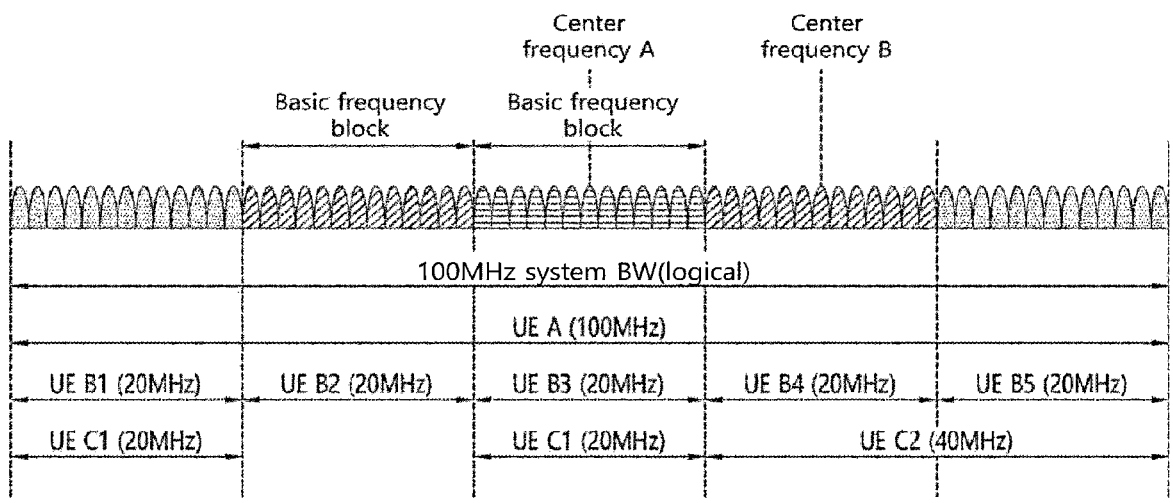
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs B1~B5 can use only a 20 MHz bandwidth and perform communication using one component carrier. UEs C1 and C2 may use a 40 MHz bandwidth and perform communication using two component carriers, respectively. The two component carriers may be logically/physically adjacent or non-adjacent. UE C1 represents the case of using two non-adjacent component carriers, and UE C2 represents the case of using two adjacent component carriers.

Figure 9:
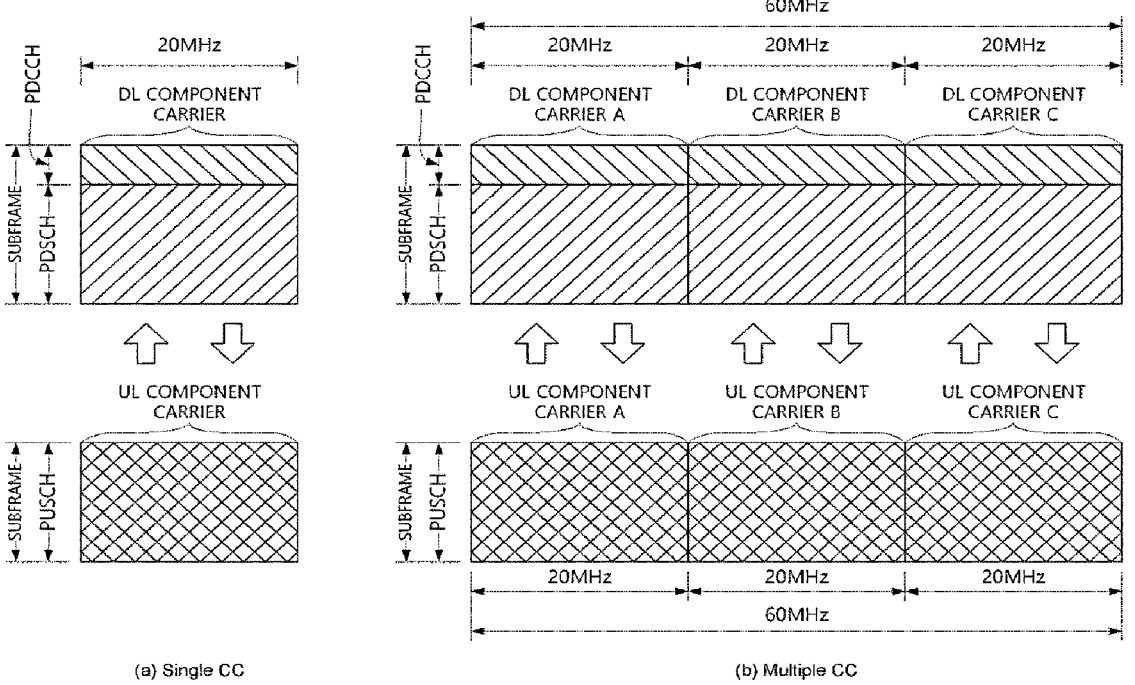
FIG. 9 is a diagram for explaining single carrier communication and multiple carrier communication.

FIG. 9 is a drawing for explaining single carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
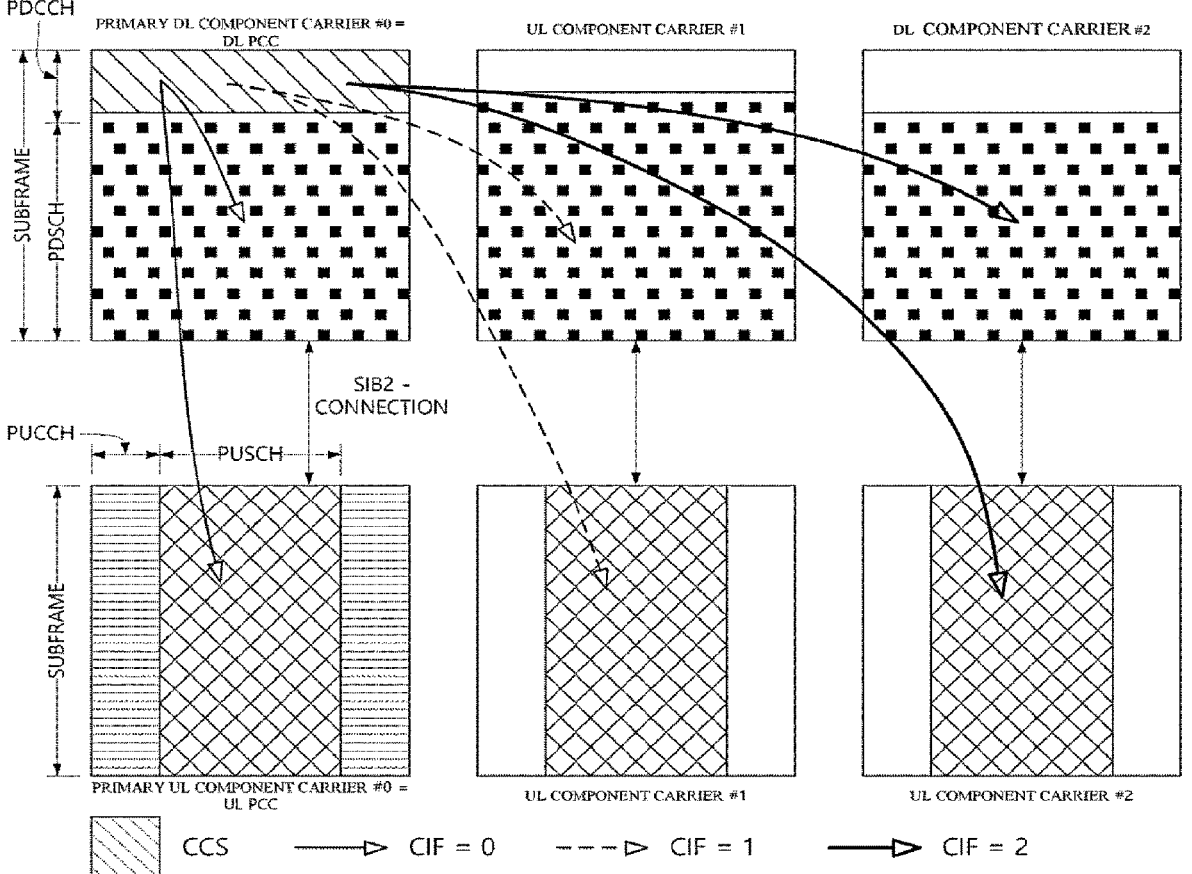
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

As described above, since the existing communication in the unlicensed band mostly operates based on LBT, a channel access in the NR-U system also performs LBT for coexistence with existing devices. Specifically, the channel access method on the unlicensed band in the NR may be classified into the following four categories according to the presence/absence of LBT/application method.

Category 1: No LBT

The Tx entity does not perform the LBT procedure for transmission.

Category 2: LBT Without Random Backoff

The Tx entity senses whether a channel is idle during a first interval without random backoff to perform a transmission. That is, the Tx entity may perform a transmission through the channel immediately after the channel is sensed to be idle during the first interval. The first interval is an interval of a predetermined length immediately before the Tx entity performs the transmission. According to an embodiment, the first interval may be an interval of 25 μs length, but the present invention is not limited thereto.

Category 3: LBT Performing Random Backoff Using CW of Fixed Size

The Tx entity obtains a random value within the CW of the fixed size, sets it to an initial value of a backoff counter (or backoff timer) N, and performs backoff by using the set backoff counter N. That is, in the backoff procedure, the Tx entity decreases the backoff counter by 1 whenever the channel is sensed to be idle for a predetermined slot period. Here, the predetermined slot period may be 9 μs, but the present invention is not limited thereto. The backoff counter N is decreased by 1 from the initial value, and when the value of the backoff counter N reaches 0, the Tx entity may perform the transmission. Meanwhile, in order to perform backoff, the Tx entity first senses whether the channel is idle during a second interval (that is, a defer duration Td). According to an embodiment of the present invention, the Tx entity may sense (determine) whether the channel is idle during the second interval, according to whether the channel is idle for at least some period (e.g., one slot period) within the second interval. The second interval may be set based on the channel access priority class of the Tx entity, and consists of a period of 16 μs and m consecutive slot periods. Here, m is a value set according to the channel access priority class. The Tx entity performs channel sensing to decrease the backoff counter when the channel is sensed to be idle during the second interval. On the other hand, when the channel is sensed to be busy during the backoff procedure, the backoff procedure is stopped. After stopping the backoff procedure, the Tx entity may resume backoff when the channel is sensed to be idle for an additional second interval. In this way, the Tx entity may perform the transmission when the channel is idle during the slot period of the backoff counter N, in addition to the second interval. In this case, the initial value of the backoff counter N is obtained within the CW of the fixed size.

Category 4: LBT Performing Random Backoff by Using CW of Variable Size

The Tx entity obtains a random value within the CW of a variable size, sets the random value to an initial value of a backoff counter (or backoff timer) N, and performs backoff by using the set backoff counter N. More specifically, the Tx entity may adjust the size of the CW based on HARQ-ACK information for the previous transmission, and the initial value of the backoff counter N is obtained within the CW of the adjusted size. A specific process of performing backoff by the Tx entity is as described in Category 3. The Tx entity may perform the transmission when the channel is idle during the slot period of the backoff counter N, in addition to the second interval. In this case, the initial value of the backoff counter N is obtained within the CW of the variable size.

In the above Category 1 to Category 4, the Tx entity may be a base station or a UE. According to an embodiment of the present invention, a first type channel access may refer to a Category 4 channel access, and a second type channel access may refer to a Category 2 channel access.

Figure 11:
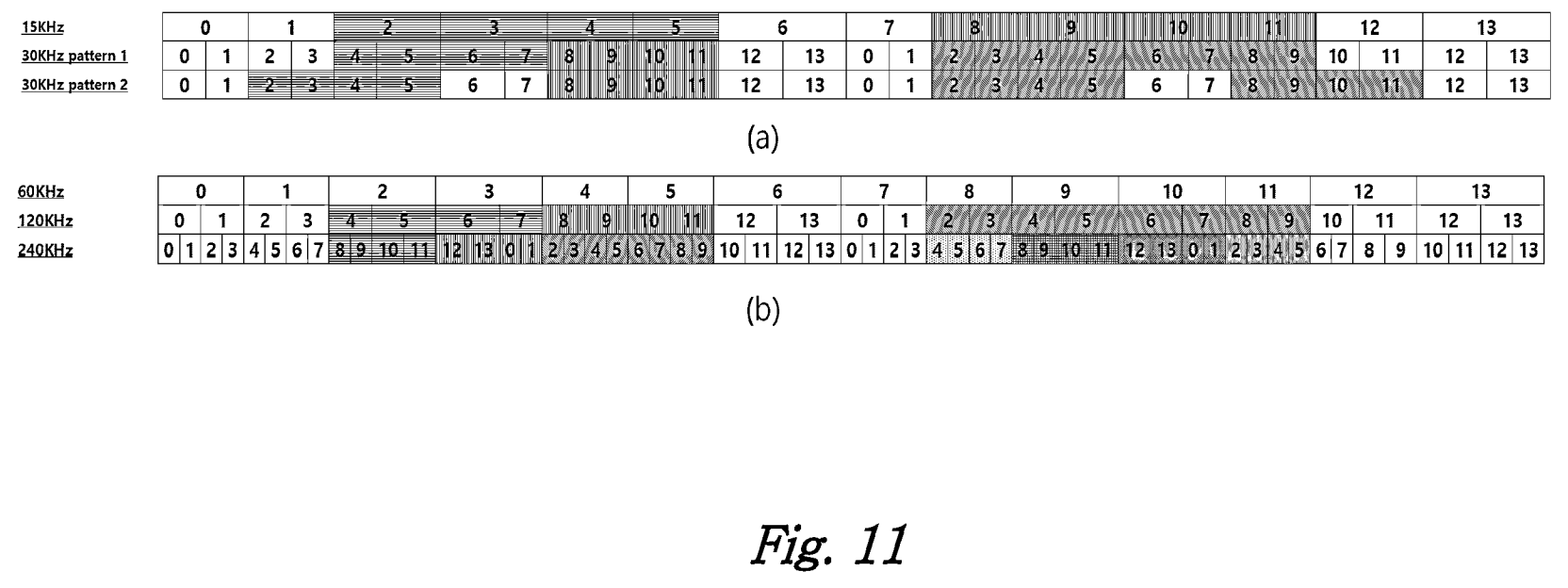

FIG. 11 is a diagram illustrating a position of an OFDM symbol occupied by SSB within a plurality of slots of a licensed band of an NR system according to an embodiment of the present invention.

The SSB may include four OFDM symbols and 20 RBs. In detail, PSS may occupy one OFDM symbol, SSS may occupy one OFDM symbol, and PBCH may occupy two OFDM symbols and one OFDM symbol multiplexed with SSS by FDM. The OFDM symbol position may be changed in a slot occupied by the SSB according to a subcarrier spacing (SCS). FIG. 11(A) shows SSB patterns when a value of the subcarrier spacing for SSB transmission is 15 kHz and 30 kHz. FIG. 11(B) shows SSB patterns when the value of the subcarrier spacing for SSB transmission is 120 kHz and 240 kHz. When the subcarrier spacing is 30 kHz, either the SSB pattern for eMBB transmission or the SSB pattern considering URLLC may be used. In FIG. 11, a hatched OFDM symbol indicates an OFDM symbol position in a slot occupied by the SSB. Furthermore, different hatching patterns indicate different SSB indices.

Figure 12:
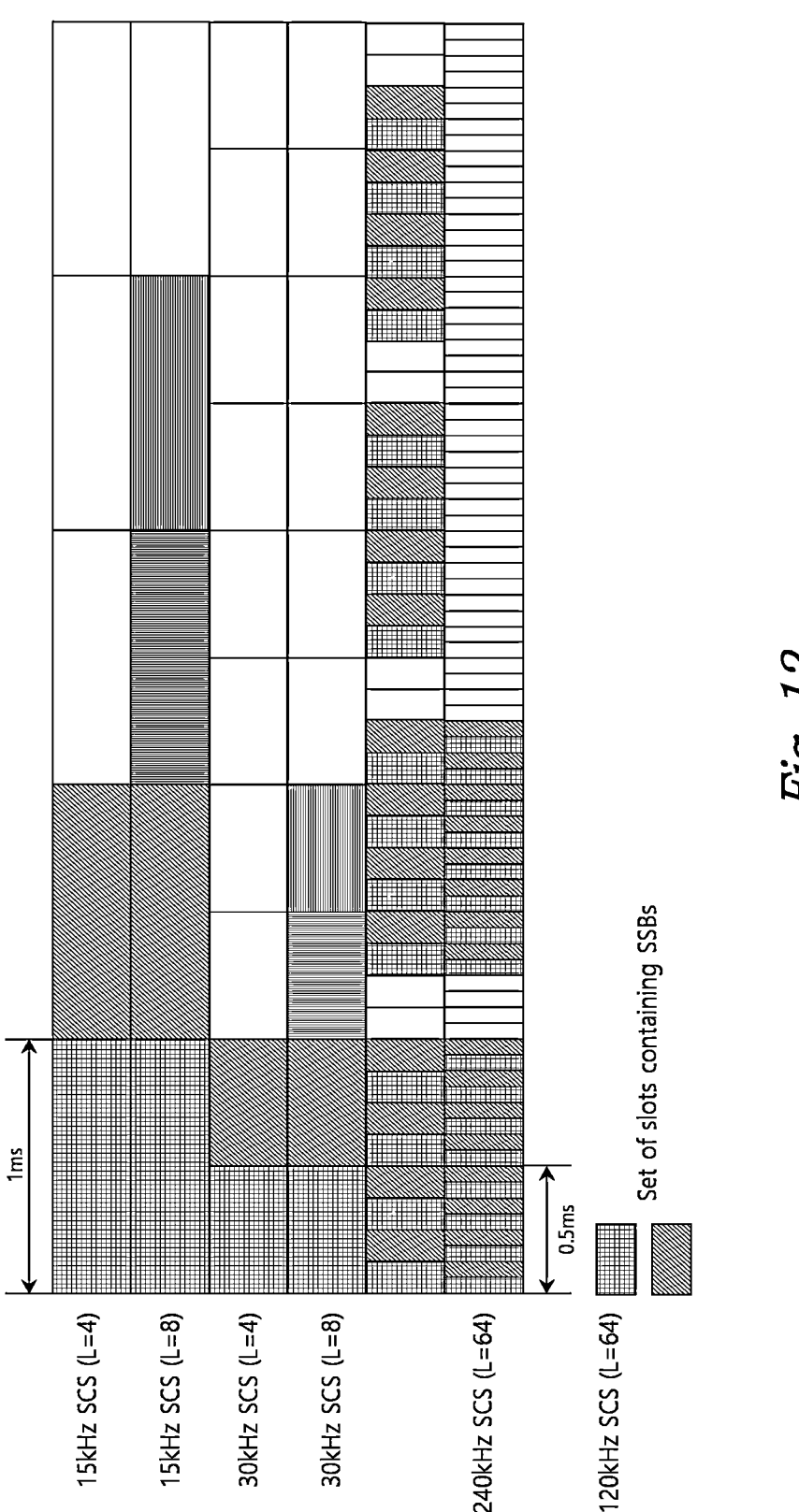
FIG. 12 is a diagram illustrating a position of a slot occupied by SSB within a half wireless frame, i.e., 5 ms, of a licensed band of an NR system according to an embodiment of the present invention.

FIG. 12 is a diagram illustrating a position of a slot occupied by SSB within a half wireless frame, i.e., 5 ms, of a licensed band of an NR system according to an embodiment of the present invention. In FIG. 12, a hatched slot indicates a position of a slot including SSB within a half wireless frame. One slot may include two SSBs. Two SSBs in one slot may have different SSB indices. Furthermore, SSBs positioned in different slots may also have different SSB indices. The SSB index will be described later again. Furthermore, in FIG. 12, L denotes a maximum number of SSBs that may be transmitted by a base station in a half wireless frame.

The NR system regulates one subcarrier spacing defined for each frequency band so as to reduce complexity of searching for, by the UE, an SSB for initial cell access. Particularly, in a case where a below-6 GHz frequency band is used, the NR system regulates use of one subcarrier spacing among 15 KHz and 30 KHz for an SSB. In addition, in a case where an above-6 GHz frequency band is used, the NR system regulates use of one subcarrier spacing among 120 KHz and 240 KHz for an SSB.

In a case where a wireless communication device performs channel access in an unlicensed band, an LBT procedure may be used. Therefore, if a channel is not idle, the wireless communication device may fail in channel access. Even when the base station performs channel access in order to transmit an SSB, the channel access may fail. Therefore, SSB transmission may not be performed at a position configured by the base station. Eventually, even in a case where the base station configures, for the UE, a position at which an SSB is transmitted, so that the UE is able to assume a position at which an SSB is transmitted, the UE may fail to receive an SSB. An SSB is periodically transmitted. Therefore, even though the UE fails to receive an SSB at one time point, the UE may receive an SSB after one period from the corresponding time point. However, in a case where the UE receives an SSB as described above, latency may occur in RRM measurement and measurement for a neighbor cell. Eventually, latency may increase in the entire system.

In addition, an SSB is used for beam link configuration and beam management. Specifically, the base station transmits multiple SSBs corresponding to different SSB indexes in different time regions. The UE configures multiple beam links by using the multiple SSBs. The base station performs beam sweeping. The UE may configure beam links according to whether the UE has received SSBs transmitted through different beams in different time regions. If the base station fails in channel access and thus fails to transmit SSBs, a problem in that the UE is unable to configure beam links occurs. Eventually, latency for beam links may increase due to channel access failure. Therefore, a method by which the number of SSB transmission failures is reduced, and SSB transmission opportunities can be expanded is required.

In a case where the NR system is used in an unlicensed band, 60 KHz subcarrier spacing may be used for SSB transmission so as to increase channel access opportunities. 15 kHz or 30 kHz subcarrier spacing may be used for SSB transmission in a below-6 GHz licensed band. In addition, 15 kHz, 30 kHz, or 60 kHz subcarrier spacing may be used for data transmission in a below-6GHz licensed band. In addition, 120 kHz or 240 KHz subcarrier spacing may be used for SSB transmission in an above-6 GHz licensed band. In addition, 60 KHz or 120 KHz subcarrier spacing may be used for data transmission in an above-6 GHz licensed band. When the NR system is used in a below-7GHz (e.g., lower than 7.125 GHz) unlicensed band, 15 kHz or 30 kHz subcarrier spacing which is the same as that used in a below-6 GHz licensed band may be considered. However, if 60 KHz subcarrier spacing is used for SSB transmission in an unlicensed band, an OFDM symbol duration is ¼ of that in a case where 15 kHz subcarrier spacing is used. Therefore, in a case where 60 kHz subcarrier spacing is used for the NR system in an unlicensed band, the opportunities of transmission of SSBs and data channels in a unit of symbols after channel access may be increased. A time for transmission of a reservation signal when the base station succeeds in channel access in one OFDM symbol in a case where 60 kHz subcarrier spacing is used may be smaller than a time for transmission of a reservation signal in a case where 15 kHz subcarrier spacing and 30 kHz subcarrier spacing are used.

Configuration of NR-U DRS (or DRS)

In an unlicensed band of the NR system, the base station may transmit a signal including at least one SSB transmission or at least one SSB burst set transmission. An SSB burst set indicates that an SSB is consecutively transmitted in a predetermined time interval. In this case, the signal may correspond to a discovery signal burst (DRS burst). The base station may transmit a DRS burst according to the following principle. The base station may transmit a DRS burst such that a gap is not included in a time interval in which the DRS burst is transmitted in a beam. The base station may transmit a DRS burst to satisfy an occupied channel bandwidth (OCB) condition. However, the base station may transmit a DRS burst which does not satisfy the occupied channel bandwidth condition in some cases. In addition, the base station may consider a method for minimizing a channel occupancy time of a DRS burst and performing rapid channel access. For convenience of explanation, a DRS will be used instead of a DRS burst.

A DRS that is transmitted in an unlicensed band may include a PDSCH including SSB-associated remaining system information (RMSI), that is, a system information block 1 (SIB1). Furthermore, a DRS may include an RMSI-CORESET which is a time and frequency resource region related to transmission of a control channel for transmitting scheduling information of RMSI. That is, a DRS may include a CORESET which is a time and frequency region for transmission of a PDCCH scheduling a PDCSH including an SIB1. In addition, a DRS may include a CSI-RS. In addition, a DRS may include a different type of signal. Specifically, a DRS may include other system information (OSI) or paging. As described above, when the base station transmits a DRS in an unlicensed band, the base station may multiplex the DRS with a physical channel or a signal. In this case, a method by which the base station performs channel access is problematic. Particularly, which method the base station uses among various channel access methods described above, and a method by which a parameter used for channel access is configured are problematic. Furthermore, a DRS may include transmission of an SSB or an SSB burst set.

In an embodiment of the present disclosure, in a case where the base station multiplexes a DRS with unicast data, the base station may perform a channel access in which a random backoff is performed using a variable-size CW, and the size of the CW is determined according to a channel access priority class, in order to perform transmission of a DRS and unicast data which are multiplexed. The UE may perform a channel access according to a channel access priority class of the multiplexed unicast data. Specifically, a channel access method may correspond to a first type channel access described above.

In these embodiments, a case where the base station multiplexes a DRS with a signal or information other than unicast data will be described. A signal or information other than unicast data may indicate a signal or a channel which is not data traffic, and thus it is impossible to configure a channel access priority class for the signal or the channel. A signal or information other than unicast data may include a control message associated with initial access, random access, mobility, or paging. In addition, a signal or information other than unicast data may include transmission including only a reference signal. In addition, a signal or information other than unicast data may include transmission including only a PDCCH. The transmission including only a PDCCH may include at least one of an RACH message-4, a handover command, a group common PDCCH, a short paging message, other system information (OSI), paging, and a random access response (RAR) under a random access procedure. In addition, a signal or information other than unicast data may also be transmitted via a PDCCH and a PDSCH. For convenience of explanation, a signal or information other than unicast data will be called non-unicast data. In addition, in the present specification, a DRS and non-unicast data being multiplexed may indicate that unicast data is not included in corresponding transmission. In a detailed embodiment, in a case where the base station multiplexes a DRS with non-unicast data, the base station may perform a channel access in which only LBT based on a single time interval is performed, in order to perform transmission of a DRS and non-unicast data which are multiplexed. The channel access in which only LBT based on a single time interval is performed may be a second type channel access described above. The duration of the single time interval may be 25 μs or 34 μs.

In another detailed embodiment, in a case where the base station multiplexes a DRS with non-unicast data, the base station may perform a channel access in which a random backoff is performed using a variable-size CW, and the size of the CW is determined according to a channel access priority class, in order to perform transmission of a DRS and non-unicast data which are multiplexed. In this embodiment, it is considered that LBT based on a single time interval can be performed only when the entire duration of transmission including only a DRS is 1 ms or less, and a duty cycle of DRS transmission is ½0 or less. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station multiplexes a DRS with non-unicast data, the base station may perform a channel access in which a random backoff is performed using a fixed size CW, in order to perform transmission of a DRS and non-unicast data which are multiplexed. A channel access method may be a category-3 channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In a case where the base station transmits non-unicast data which has not been multiplexed with a DRS, the base station may perform a channel access for transmission of non-unicast data by using a channel access method that is used when non-unicast data and a DRS are multiplexed. Specifically, in a case where the base station transmits non-unicast data which has not been multiplexed with a DRS, the base station may use a channel access type and a channel access parameter that are used when non-unicast data and a DRS are multiplexed.

In another detailed embodiment, in a case where the base station transmits non-unicast data which has not been multiplexed with a DRS, the base station may perform a channel access in which a random backoff is performed using a variable-size CW, and the size of the CW is determined according to a channel access priority class, in order to perform the transmission of non-unicast data. Specifically, a channel access method may correspond to a first type channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station transmits non-unicast data which has not been multiplexed with a DRS, the base station may perform a channel access in which a random backoff is performed using a fixed size CW, in order to perform the transmission of non-unicast data. A channel access method may be a category-3 channel access described above. In this embodiment, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In the embodiments described above, the base station determines a channel access method for transmission of a DRS and non-unicast data or unicast data which are multiplexed, regardless of the duration of the transmission of a DRS and non-unicast data or unicast data which are multiplexed, and the duty cycle of DRS transmission. When the base station determines a channel access method, the base station may assume that transmission including only a DRS and transmission of a DRS and non-unicast data which are multiplexed are the same. Specifically, the base station may determine a channel access method for transmission of a DRS and non-unicast data or unicast data which are multiplexed, based on the duration of the transmission of a DRS and non-unicast data or unicast data which are multiplexed, and the duty cycle of DRS transmission. The base station may determine a channel access method for transmission of a DRS and non-unicast data or unicast data which are multiplexed, based on whether the duration of the transmission of a DRS and non-unicast data or unicast data which are multiplexed is 1 ms or less, and the duty cycle of DRS transmission is ½0 or less.

When the base station performs transmission of a DRS and non-unicast data which are multiplexed, the base station may select one of two channel access types according to whether both of two conditions are satisfied, the two conditions being that the duration of the transmission of a DRS and non-unicast data which are multiplexed is 1 ms or shorter, and that the duty cycle of DRS transmission is ½0 or less. One of the two channel access types indicates a channel access in which only LBT based on a single time interval is performed, and the other one indicates a channel access in which a random backoff is performed using a variable-size CW, and the size of the CW is determined according to a channel access priority class. In a detailed embodiment, if the duration of the transmission of a DRS and non-unicast data which are multiplexed is 1 ms or shorter, or the duty cycle of DRS transmission is ½0 or less, the base station may perform a channel access in which only LBT based on a single time interval is performed, in order to perform the transmission of a DRS and non-unicast data which are multiplexed. The duration of the single time interval may be 25 μs. In addition, the LBT based on the single time interval may correspond to a second type channel access described above. In another detailed embodiment, if the duration of the transmission of a DRS and non-unicast data which are multiplexed is longer than 1 ms, or the duty cycle of DRS transmission is larger than ½₀, the base station may perform a channel access in which a random backoff is performed using a variable-size CW, and the size of the CW is determined according to a channel access priority class, in order to perform the transmission of a DRS and non-unicast data which are multiplexed. In addition, the base station may select a random channel access priority class. The base station may randomly select one of channel access priority classes satisfying a condition of a MCOT length according to the duration of the transmission of a DRS and non-unicast data which are multiplexed. The base station may use a selected channel access priority class for a channel access for the transmission of a DRS and non-unicast data which are multiplexed. That is, the base station may use, for a channel access, a CW size according to the selected channel access priority class. For example, the base station may use a channel access priority class (e.g., channel access priority class #1) having the highest priority. Therefore, the base station may assign a higher channel access priority to non-unicast data compared to unicast data. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In the above embodiments, in a case where the base station is able to determine whether the non-unicast data is received by the UE, and whether the same is successfully received, the base station may adjust a CW size, based on a ratio between an ACK and an NACK. Specifically, the base station may convert feedback information on non-unicast data, which is received from the UE according to the reception by the UE, into an ACK and an NACK, and may adjust a CW size, based on the ratio between the ACK and the NACK. A channel access method in which a random backoff is performed using a variable-size CW, and the size of the CW is determined according to a channel access priority class may correspond to a first type channel access.

As described above, the base station and the UE may control a CW size, based on a HARQ feedback at a time of a channel access using a CW. However, the base station and the UE may be unable to expect a HARQ feedback on the entirety or a part of non-unicast data. In addition, the base station and the UE may be unable to determine whether the UE or the base station has received the entirety or a part of non-unicast data. In addition, in a case where the base station and the UE are required to perform an initial access procedure, the base station and the UE may be unable to determine an HARQ-ACK feedback with respect to a part of a downlink signal and channel and an uplink signal and channel, which are used in the initial access procedure. In addition, the base station and the UE may not perform transmission related to a particular channel access priority class, and thus may be unable to determine an HARQ-ACK feedback corresponding to transmission related to the corresponding channel access priority class. In this case, a method for determining, by the base station and the UE, a CW to be used for a channel access at a time of transmission of a channel and a signal including the entirely or a part of non-unicast data, on which it is impossible to expect an HARQ feedback, will be described. For convenience of explanation, the base station is explained as a subject, but embodiments to be described below may also be applied to the UE in the same way.

When the base station is unable to determine an HARQ-ACK feedback related to transmission associated with a channel access priority class determining a CW size, the base station may perform a channel access in which a random backoff is performed in a CW corresponding to the channel access priority class. The base station may use the smallest CW size among CW sizes allowed in the corresponding channel access priority class. In another detailed embodiment, the base station may use a channel access priority class having the highest priority, and use the largest CW size among CW sizes allowed in the channel access priority class.

In addition, in a case where the base station is unable to determine whether the UE has received the entirety or a part of non-unicast data, on which it is impossible to expect an HARQ feedback, the base station may perform a channel access in which a random backoff is performed in a fixed CW size, in order to transmit the non-unicast data and a DRS which are multiplexed. Specifically, the base station may use a CW corresponding to one channel access priority class at a time of a first type channel access described above. In a detailed embodiment, the base station may use one of channel access priority classes satisfying a condition of a MCOT length according to the duration of transmission of a DRS and non-unicast data which are multiplexed, at a time of a first type channel access. The base station may use a channel access priority class having the highest priority. In a detailed embodiment, the base station may use a channel access priority class having the highest priority among channel access priority classes satisfying a condition of a MCOT length according to the duration of transmission of a DRS and non-unicast data which are multiplexed, at a time of a first type channel access. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

In another detailed embodiment, in a case where the base station is unable to determine whether the UE has received the entirety or a part of non-unicast data, on which it is impossible to expect an HARQ feedback, the base station may perform a category-3 channel access described above, in order to transmit the non-unicast data and a DRS which are multiplexed. The base station may use a channel access priority class having the highest priority. The base station may use a channel access priority class having the highest priority among channel access priority classes satisfying a condition of a MCOT length according to the duration of transmission of a DRS and non-unicast data which are multiplexed. In addition, the base station may use a channel access priority class having the highest priority, and use the smallest CW size among CW sizes allowed in the channel access priority class. In another detailed embodiment, the base station may use a channel access priority class having the highest priority, and use the largest CW size among CW sizes allowed in the channel access priority class.

The base station may be unable to transmit SSB due to a channel access (e.g., LBT) procedure failure. When the base station is unable to transmit SSB at a configured position, an SSB transmission window may be defined so that SSB may be transmitted at another position. The SSB transmission window is a time interval in which the base station may transmit SSB, and includes a plurality of SSB transmission position candidates. When the base station fails to start SSB transmission at a certain SSB transmission position candidate, the base station may attempt to transmit SSB at an SSB transmission position candidate that is later than the certain SSB transmission position candidate within the SSB transmission window. The SSB transmission position candidate is a point in time at which the base station may start transmission of SSB. When the user equipment fails to receive SSB at a certain SSB transmission position candidate within the SSB transmission window, the user equipment may receive SSB at an SSB transmission position candidate that is later than the certain SSB transmission position candidate within the SSB transmission window. Here, the user equipment may determine whether the base station was unable to start SSB transmission or SSB transmission of the base station has failed at an SSB transmission position candidate. In a specific embodiment, when the user equipment fails to receive SSB at a certain SSB transmission position candidate within the SSB transmission window, the user equipment may attempt to receive SSB at an SSB transmission position candidate next to the certain SSB transmission position candidate within the SSB transmission window. After completing reception of SSB after starting to receive SSB at a certain SSB transmission position candidate, the user equipment may not expect to receive additional SSB within the corresponding SSB transmission window. In detail, after completing reception of SSB after starting to receive SSB at a certain SSB transmission position candidate, the user equipment may not attempt to receive additional SSB within the corresponding SSB transmission window.

In another specific embodiment, when the user equipment fails to receive specific SSB at a certain SSB transmission position candidate within the SSB transmission window, the user equipment may attempt to receive the specific SSB at an SSB transmission position candidate next to the certain SSB transmission position candidate within the SSB transmission window. After completing reception of the specific SSB after starting to receive the specific SSB at a certain SSB transmission position candidate, the user equipment may not perform reception of the specific SSB within the corresponding SSB transmission window. In detail, after receiving the specific SSB at a certain SSB transmission position candidate, the user equipment may not additionally attempt to receive the specific SSB within the corresponding SSB transmission window.

In another specific embodiment, even after completing reception of the specific SSB at a certain SSB transmission position candidate, the user equipment may attempt to receive the specific SSB within the corresponding SSB transmission window. This is because the user equipment may additionally receive the specific SSB and may obtain a combining gain through the additionally received specific SSB. These embodiments may be applied not only to the case were a plurality of SSBs corresponding to different beam indices are transmitted for beam operation but also to the case were an omni-transmission (omni-TX) scheme is used. In detail, the embodiments may also be applied to the case where the same SSB is repeatedly transmitted.

LBT Method of DRS

Figure 13:
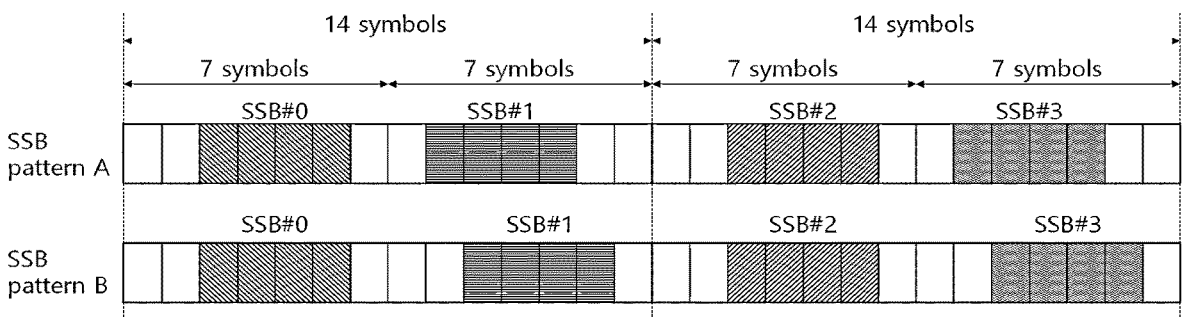
FIG. 13 is a diagram illustrating positions of OFDM symbols occupied by SSB within a slot including 16 OFDM symbols according to an embodiment of the present invention.

FIG. 13 is a diagram illustrating a position of an OFDM symbol occupied by SSB within a slot including 14 OFDM symbols according to an embodiment of the present invention.

Hereinafter, a channel access method for DRS including at least one SSB will be described with reference to FIG. 13. In detail, described below is a channel access method performed by the base station before transmitting DRS according to the number of SSBs included in DRS to be transmitted from the base station, i.e., a configuration method for performing different LBTs.

FIG. 13 illustrate positions of OFDM symbols occupied by SSB within a slot configured with 14 OFDM symbols. SSB pattern A is the same as the positions of OFDM symbols occupied by SSB of the NR system defined in 3GPP Rel. 15. In SSB pattern B, an OFDM symbol occupied by SSB in a second half slot within one slot is positioned behind by one symbol compared to the SSB pattern A. Therefore, the SSB pattern B is configured so that the positions of OFDM symbols occupied by SSM within one slot are symmetrical to each other in units of half slot.

In a case were the total duration of transmission including a DRS is 1 ms or longer, the base station may perform multiple transmissions and may determine a channel access method for each of multiple DRS transmissions.

If an unlicensed band such as a 5 GHz band or a 6 GHz band is used, the base station may transmit a maximum of n number of SSBs in a DRS. A value of n may be 2, 4, or 8. In addition, subcarrier spacing used for DRS transmission may be 15 KHz or 30 KHz. If the subcarrier spacing is 15 KHz, the duration of one slot may be 1 ms, and the number of SSBs which can be included in the 1 ms interval may be 2. In addition, if the subcarrier spacing is 30 KHz, the duration of one slot may be 0.5 ms, and the number of SSBs which can be included in the 1 ms interval may be 4. The length of the total duration of DRS transmission having a duty cycle of $\frac{1}{20}$ may change according to a DRS transmission period configuration.

As described above, the total duration of transmission including a DRS may be 1 ms or less, and the duty cycle of DRS transmission may be $\frac{1}{20}$ or less. In a case where the base station performs transmission including only a DRS or transmission of a DRS and non-unicast data which are multiplexed, the base station may perform a channel access in which only LBT based on a single time interval is performed, for corresponding transmission. The channel access in which only LBT based on a single time interval is performed may be a second type channel access described above. The total duration of transmission including a DRS may be longer than 1 ms, and the duty cycle of DRS transmission may be larger than $\frac{1}{20}$. In a case where the base station performs transmission including only a DRS or transmission of a DRS and non-unicast data which are multiplexed, the base station may perform a channel access in which a random backoff is performed using a variable-size CW, and the size of the CW is determined according to a channel access priority class, in order to perform corresponding transmission. The channel access method in which a random backoff is performed using a variable-size CW, and the size of the CW is determined according to a channel access priority class may correspond to a first type channel access.

In an embodiment of the present disclosure, a method for performing, by the base station, LBT based on a single time interval may be used in consideration of a characteristic of transmission including a DRS. If the total duration of transmission including a DRS is larger than 1 ms, the base station may determine a channel access method in a unit of 1 ms duration. Specifically, if the total duration of transmission including a DRS is longer than 1 ms, the base station may perform multiple transmissions each having a duration of 1 ms or less, and may perform a channel access including only LBT based on a single time interval, for each of the multiple transmissions. The base station may apply this embodiment to only a case where the duty cycle of DRS transmission is 1/20 or less. This is because, in a case of transmission performed without LBT, there is an ETSI regulation wherein a short control signal is required not to exceed 5% of the corresponding transmission. Through the above embodiments, the base station and the UE can rapidly perform initial access and RRM measurement through an SSB included in a DRS transmitted from the base station. For example, when the period of DRS transmission is configured to be 40 ms or longer, and the base station performs DRS transmission in a 5 ms interval configured as a DRS transmission window every minimum 40 ms period unit, the total duration of transmission including a DRS satisfying a condition that the duty cycle of DRS transmission is 1/20 or less may be 2 ms or less. The base station may perform multiple DRS transmissions each having a duration of 1 ms or less under a restriction wherein the total duration of transmission including a DRS is 2 ms or less. The base station may perform a second type channel access before performing each of the multiple transmissions. Through this embodiment, the base station can rapidly perform transmission of a DRS to the UE. In addition, when the period of DRS transmission is configured to be 80 ms or longer, and the base station performs DRS transmission in a 5 ms interval configured as a DRS transmission window every minimum 80 ms period unit, the total duration of transmission including a DRS satisfying a condition that the duty cycle of DRS transmission is 1/20 or less may be 4 ms or less. The base station may perform multiple DRS transmissions each having a duration of 1 ms or less under a restriction wherein the total duration of transmission including a DRS is 4 ms or less. The base station may perform a second type channel access before performing each of the multiple transmissions.

In addition, if the total duration of transmission including a DRS is longer than 1 ms, and the duty cycle of DRS transmission is larger than 1/20, the base station may perform a channel access in which a random backoff is performed using a variable-size CW, and the size of the CW is determined according to a channel access priority class, in order to perform the transmission including a DRS. The channel access method may correspond to a first type channel access.

In another detailed embodiment, a partial interval of transmission including a DRS may have a transmission duty cycle of 1/20 or less. The base station may perform a channel access in which only LBT based on a single time interval is performed, for a partial transmission interval of the transmission interval of transmission including a DRS, the duty cycle of which is 1/20 or less. In addition, in this embodiment, the base station may perform multiple transmissions each having a duration of 1 ms or less, and may perform a channel access including only LBT based on a single time interval, for each of the multiple transmissions. The channel access in which only LBT based on a single time interval is performed may be a second type channel access. In addition, the base station may perform a channel access in which a random backoff is performed using a variable-size CW, and the size of the CW is determined according to a channel access priority class, for the remaining transmission interval of the transmission interval of the transmission including a DRS. The channel access in which a random backoff is performed using a variable-size CW, and the size of the CW is determined according to a channel access priority class may be a first type channel access. For example, the period of DRS transmission may be a multiple of 20 ms. Specifically, if the period of DRS transmission is 20 ms, the duration of a transmission interval in which the duty cycle of the DRS transmission is 1/20 or less is 1 ms. If the period of DRS transmission is 40 ms, the duration of a transmission interval in which the duty cycle of the DRS transmission is 1/20 or less is 2 ms. If the period of DRS transmission is 60 ms, the duration of a transmission interval in which the duty cycle of the DRS transmission is 1/20 or less is 3 ms. If the period of DRS transmission is 80 ms, the duration of a transmission interval in which the duty cycle of the DRS transmission is 1/20 or less is 4 ms. The base station may perform a second type channel access for a partial transmission interval of a transmission interval of transmission including a DRS, the duty cycle of which is 1/20, and may perform a first type channel access for the remaining transmission interval of the transmission interval of the transmission including a DRS.

A maximum number of SSBs which can be included in a DRS may be 8. The following description will be given under the assumption that the number of SSBs included in a DRS is 8. If the period of DRS transmission is 20 ms, the duration of a transmission interval in which the duty cycle of the DRS transmission is 1/20 or less is 1 ms. Therefore, if subcarrier spacing is 15 KHz, two SSBs may be included in the transmission interval in which the duty cycle of the DRS transmission is 1/20 or less. The base station may perform a second type channel access before performing first transmission, and if the channel access is successful, the base station may transmit two SSBs. In addition, the base station may perform a first type channel access before performing second transmission, and if the channel access is successful, the base station may transmit six SSBs. In addition, if the period of DRS transmission is 20 ms, the duration of a transmission interval in which the duty cycle of the DRS transmission is 1/20 or less is 1 ms. Therefore, if subcarrier spacing is 30 KHz, four SSBs may be included in the transmission interval in which the duty cycle of the DRS transmission is 1/20 or less. The base station may perform a second type channel access before performing first transmission, and if the channel access is successful, the base station may transmit four SSBs. In addition, the base station may perform a first type channel access before performing second transmission, and if the channel access is successful, the base station may transmit four SSBs.

If the period of DRS transmission is 40 ms, the duration of a transmission interval in which the duty cycle of the DRS transmission is 1/20 or less is 2 ms. Therefore, if subcarrier spacing is 15 KHz, four SSBs may be included in the transmission interval in which the duty cycle of the DRS transmission is 1/20 or less. The base station may perform transmission having a duration of 1 ms twice, and may transmit two SSBs through each transmission. The base station may perform a second type channel access before performing first transmission, and if the channel access is successful, the base station may transmit two SSBs. In addition, the base station may perform a second type channel access before performing second transmission, and if the channel access is successful, the base station may transmit two SSBs. In addition, the base station may perform a first type channel access before performing third transmission, and if the channel access is successful, the base station may transmit the remaining four SSBs. In addition, if the period of DRS transmission is 40 ms, the duration of a transmission interval in which the duty cycle of the DRS transmission is $\frac{1}{20}$ or less is 2 ms. Therefore, if subcarrier spacing is 30 KHz, eight SSBs may be included in the transmission interval in which the duty cycle of the DRS transmission is $\frac{1}{20}$ or less. The base station may perform a second type channel access before performing first transmission, and if the channel access is successful, the base station may transmit four SSBs. In addition, the base station may perform a second type channel access before performing second transmission, and if the channel access is successful, the base station may transmit four SSBs.

In another detailed embodiment, a partial interval of transmission including a DRS may have a duration of 1 ms or less and a DRS transmission duty cycle of $\frac{1}{20}$ or less. The base station may perform a channel access in which only LBT based on a single time interval is performed, for the partial interval of the transmission including a DRS, which has a duty cycle of $\frac{1}{20}$ or less and a duration of 1 ms or less. The channel access in which only LBT based on a single time interval is performed may be a second type channel access. In addition, the base station may perform, for the remaining transmission interval, a channel access in which a random backoff is performed using a variable-size CW, and the size of the CW is determined according to a channel access priority class. The channel access in which a random backoff is performed using a variable-size CW, and the size of the CW is determined according to a channel access priority class may be a first type channel access.

A maximum number of SSBs which can be included in a DRS may be 8. The following description will be given under the assumption that the number of SSBs included in a DRS is 8.

If the period of DRS transmission is 20 ms, the duration of a transmission interval in which the duty cycle of the DRS transmission is $\frac{1}{20}$ or less is 1 ms. Therefore, if subcarrier spacing is 15 KHz, two SSBs may be included in the transmission interval in which the duty cycle of the DRS transmission is $\frac{1}{20}$ or less. The base station may perform a second type channel access before performing first transmission, and if the channel access is successful, the base station may transmit two SSBs. In addition, the base station may perform a first type channel access before performing second transmission, and if the channel access is successful, the base station may transmit six SSBs. In addition, if the period of DRS transmission is 20 ms, the duration of a transmission interval in which the duty cycle of the DRS transmission is $\frac{1}{20}$ or less is 1 ms. Therefore, if subcarrier spacing is 30 KHz, four SSBs may be included in the transmission interval in which the duty cycle of the DRS transmission is $\frac{1}{20}$ or less. The base station may perform a second type channel access before performing first transmission, and if the channel access is successful, the base station may transmit four SSBs. In addition, the base station may perform a first type channel access before performing second transmission, and if the channel access is successful, the base station may transmit four SSBs.

If the period of DRS transmission is 40 ms, the duration of a transmission interval in which the duty cycle of the DRS transmission is $\frac{1}{20}$ or less is 2 ms. If subcarrier spacing is 15 KHz, two SSBs may be included in a transmission interval having a duration of 1 ms and a DRS transmission duty cycle of $\frac{1}{20}$ or less. The base station may perform a second type channel access before performing first transmission, and if the channel access is successful, the base station may transmit two SSBs. In addition, the base station may perform a first type channel access before performing second transmission, and if the channel access is successful, the base station may transmit the remaining six SSBs. In addition, if the period of DRS transmission is 40 ms, the duration of a transmission interval in which the duty cycle of the DRS transmission is $\frac{1}{20}$ or less is 2 ms. If subcarrier spacing is 30 KHz, four SSBs may be included in a transmission interval having a duration of 1 ms and a DRS transmission duty cycle of $\frac{1}{20}$ or less. The base station may perform a second type channel access before performing first transmission, and if the channel access is successful, the base station may transmit four SSBs. In addition, the base station may perform a first type channel access before performing second transmission, and if the channel access is successful, the base station may transmit four SSBs.

In addition, a DRS transmission window duration may be configured to be T ms. T may be a natural number of 1 or more. T may be 5 or 6. Alternatively, T may be configured to be a multiple of a minimum time interval in which a maximum available number of SSBs included in a DRS can be included. If the duration of a DRS transmission window is 1 ms or more, the base station may perform a channel access in which only LBT based on a single time interval is performed, before the last 1 ms of the DRS transmission window. If the DRS transmission duty cycle of the last 1 ms of the DRS transmission window is $\frac{1}{20}$ or less, the base station may perform a channel access in which only LBT based on a single time interval is performed, before the last 1 ms of the DRS transmission window. The channel access in which only LBT based on a single time interval is performed may be a second type channel access described above. In addition, the base station may perform a first type channel access or a second type channel access before the last 1 ms of the DRS transmission window. Through these embodiments, the UE can rapidly perform initial access and RRM measurement.

Hereinafter, an LBT procedure used by a wireless communication device when performing channel access in an unlicensed band according to an embodiment of the present invention will be described. In particular, channel access in which a wireless communication device performs transmission according to a result of channel sensing within a time interval of pre-specified duration may be configured for the wireless communication device. A method for operating the wireless communication device when the wireless communication device fails in channel access will be described. The pre-specified duration may be 16 μs.

For convenience, a wireless communication device which is a wireless endpoint initiating channel occupancy is referred to as an initiating node. Furthermore, a wireless communication device which is a wireless endpoint communicating with the initiating node is referred to as a responding node. The initiating node may be the base station, and the responding node may be the user equipment. Furthermore, the initiating node may be the user equipment, and the responding node may be the base station. When the initiating node attempts to transmit data, the initiating node may perform channel access according to a channel access priority class determined according to the type of data. Here, a parameter used in channel access may be determined according to the type of data. The parameter used in channel access may include at least one of a minimum value of CW, a maximum value of CW, a maximum channel occupancy time (MCOT) that is maximum duration of one occurrence of channel occupancy, or the number ($m_p$) of sensing slots. In detail, the initiating node may perform the above-described category 4 LBT according to a channel access priority class determined according to the type of data.

Following Table 4 shows an example of a value of the parameter used in channel access according to a channel access priority class. In detail, Table 4 shows the value of the parameter used in channel access for each channel access priority class for downlink transmission in an LTE LAA system.

When a downlink channel transmitted by a wireless communication device includes data traffic, defer duration may be configured according to a channel access priority class of the traffic included in the downlink channel. Furthermore, the defer duration may include an initial interval $T_f$ and at least one $(m_p)$ slot interval $T_{sl}$. Here, the duration of the slot interval $T_{sl}$ may be 9 μs. The initial interval includes one idle slot interval $T_{sl}$. Furthermore, the number $(m_p)$ of slot intervals included in the defer duration may be configured according to a channel access priority class as described above. In detail, the number $(m_p)$ of slot intervals included in the defer duration may be configured as shown in Table 4.

TABLE 4

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Furthermore, the wireless communication device may configure a range of a CW value according to a channel access priority class. In detail, the wireless communication device may configure the value of CW so as to satisfy $CW_{min,p} <= CW <= CW_{max,p}$. Here, the minimum value $CW_{min,p}$ and maximum value $CW_{max,p}$ of CW may be determined according to a channel access priority class. In detail, the minimum value $CW_{min,p}$ and maximum value $CW_{max,p}$ of CW may be determined as shown in Table 4. The wireless communication device may configure the minimum value $CW_{min,p}$ and maximum value $CW_{max,p}$ of CW in a counter value configuration procedure. When the wireless communication device accesses a channel, the wireless communication device may adjust the value of CW. Furthermore, the wireless communication device may determine $MCOT(T_{mcot,p})$ in an unlicensed band according to a channel access priority of data included in transmission as described above. In detail, MCOT may be determined as shown in Table 4. Accordingly, the wireless communication device may not be allowed to continuously transmit during a time that exceeds MCOT in an unlicensed band. This is because the unlicensed band is a frequency band that multiple wireless communication devices use according to a regular rule. When the value of a channel access priority class is p=3 or p=4 in Table 4, and there is no wireless communication device which uses an unlicensed band during a long term according to a regulation and uses other technology, the wireless communication device may set $T_{mcot,p}$=10 ms. Otherwise, the wireless communication device may set $T_{mcot,p}$=8 ms.

Figure 14:
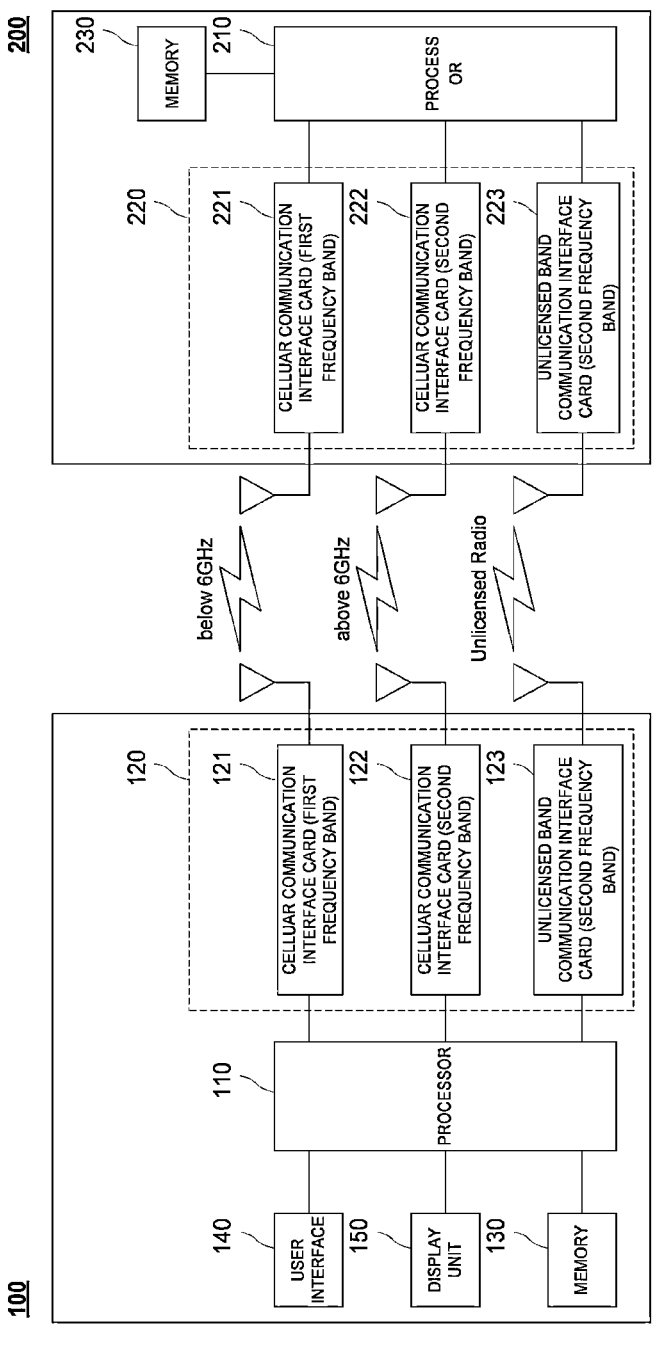
FIG. 14 is a block diagram illustrating configuration of a user equipment and a base station according to an embodiment of the present invention.

FIG. 14 is a block diagram illustrating configuration of a user equipment and a base station according to an embodiment of the present invention.

In an embodiment of the present invention, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present invention, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present invention. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present invention may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present invention. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the UE 100, an external device, and a server in accordance with the cellular communication standards or protocols in the frequency bands 6 GHz or more supported by the corresponding NIC module.

The unlicensed band communication interface card 223 transmits or receives a radio signal with at least one of the UE 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 14 is a block diagram illustrating the UE 100 and the base station 200 according to an embodiment of the present invention, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

Figure 15:
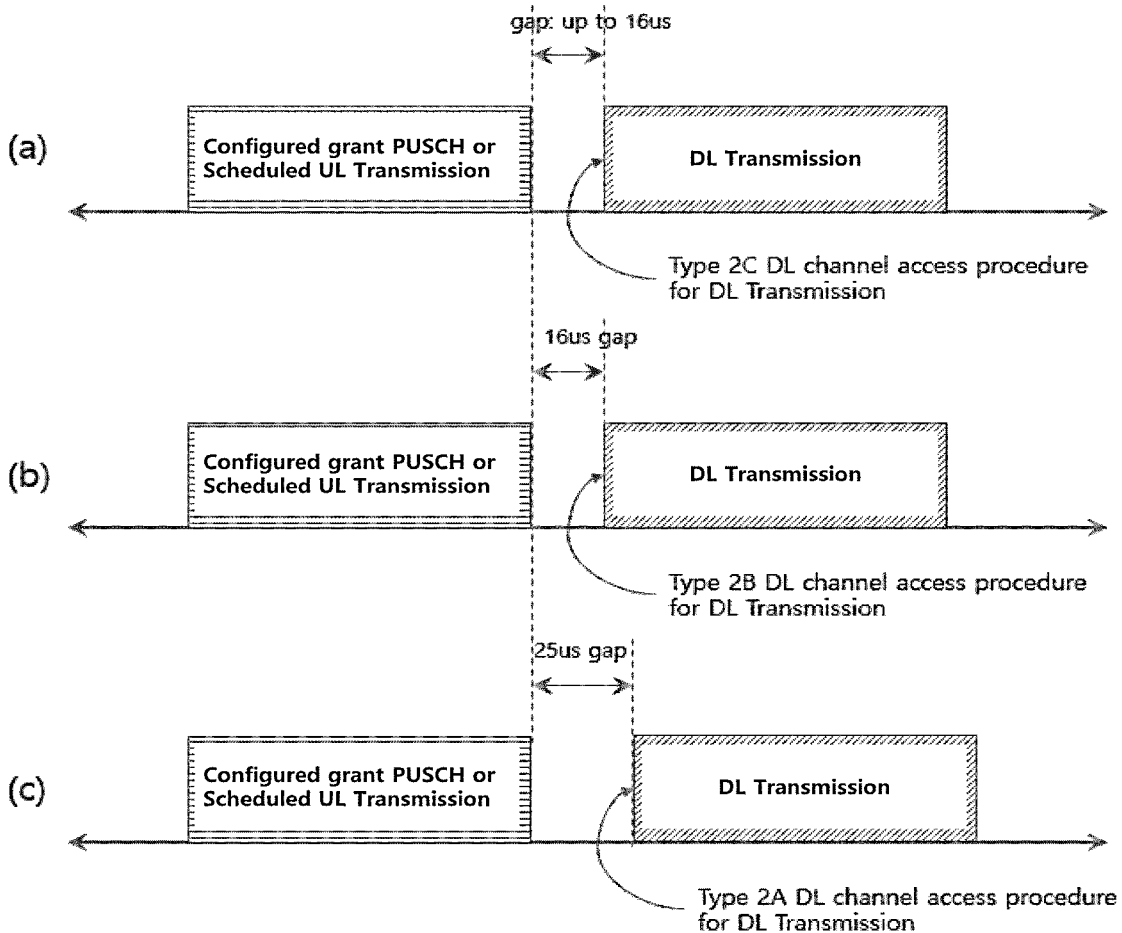
FIG. 15 is a diagram illustrating a downlink channel access procedure according to an embodiment of the present invention.

FIG. 15 is a diagram illustrating a downlink channel access procedure according to an embodiment of the present invention.

FIG. 15 is a diagram illustrating a downlink channel access procedure used at the time of UE initiated channel occupancy time (COT) sharing. FIG. 15(A) illustrates an example of the downlink channel access procedure when a gap is less than 16 μs, FIG. 15(B) illustrates an example of the downlink channel access procedure when the gap is 16 μs, and FIG. 15(C) illustrates an example of the downlink channel access procedure when the gap is 25 μs.

In order to perform uplink (e.g., PUSCH) transmission on a scheduled resource or configured resource, the user equipment may obtain channel occupancy initiated by the user equipment using a category 4 channel access procedure.

Furthermore, the user equipment may share channel occupancy with the base station for base station transmission.

When Information About an Energy Detection (ED) Threshold is Configured

The user equipment may receive, from the base station, the threshold of ED applied when obtaining channel occupancy. For example, the base station may configure the threshold of ED by transmitting 'ULtoDL-CO-SharingED-Threshold-r16' as an RRC parameter for the threshold of ED to the user equipment. When the user equipment shares channel occupancy with the base station, the base station may transmit a specific channel or specific signal. Here, uplink transmission may be configured grant (CG)-PUSCH or scheduled uplink (e.g., scheduled grant PUSCH) transmission. After uplink transmission of the user equipment, downlink transmission of the base station may be performed. In the present specification, CG uplink transmission (e.g., CG-PUSCH) may be uplink transmission (e.g., CG-PUSCH) for which the base station semi-statically configures a resource for uplink transmission in advance for the user equipment, and which is performed by the user equipment on the resource configured in advance.

When uplink transmission performed by the user equipment is CG-PUSCH, the user equipment may receive a table for sharing channel occupancy from the base station. In detail, the user equipment may receive, from the base station, a configuration of a table for sharing channel occupancy-related information (e.g., channel occupancy time (COT)) between the base station and the user equipment by RRC parameter 'COT-SharingList-r16'. Furthermore, the user equipment may receive, from the base station, channel occupancy information corresponding to each row of the table. For example, the channel occupancy information corresponding to each row of the table may be provided through an RRC parameter 'cg-COT-Sharing-r16'. Here, one of rows of the table may be configured to indicate that channel occupancy is not shared. When the user equipment shares, with the base station, channel occupancy initiated by the user equipment to perform CG-PUSCH, the user equipment may indicate an index (row index) corresponding to one row of the table, configured from the base station, through COT sharing information included in CG-uplink control information (UCI) of CG-PUSCH. That is, when the user equipment indicates an index corresponding to one row of the table that provides channel occupancy information, the base station may perform downlink transmission by assuming one or more values corresponding to channel occupancy information indicated by the row of the table indicated by the index. In detail, the channel occupancy information may include duration, offset, CAPC, etc. The duration may represent the number of slots that are available (assumable) in downlink transmission within a time of channel occupancy initiated by the user equipment. The offset represents a time interval (difference) from an end of a slot in which the base station has detected CG-UCI to a slot in which downlink transmission performed by the base station is started. The CAPC represents a CAPC assumed when the user equipment shares channel occupancy initiated by the user equipment with the base station.

When Information About an Energy Detection (ED) Threshold is Not Configured

There may occur a case where the base station does not configure the threshold of ED for the user equipment. In other words, there may occur a case where the user equipment is unable to receive the threshold of ED from the base station. That is, the base station may not configure 'ULtoDL-CO-SharingED-Threshold-r16' as an RRC parameter for the threshold of ED, and may not configure the threshold of ED for the user equipment. Here, when uplink transmission performed by the user equipment is CG-PUSCH, CG-UCI of CG-PUSCH may include 'COT sharing information' indicating whether channel occupancy is shared. When the user equipment indicates that channel occupancy is shared through CG-UCI (e.g., when a value of COT sharing information is 1), the user equipment may allow X number of symbol(s) configured from the base station for downlink transmission performed by the base station. In detail, the user equipment may receive, from the base station, an RRC parameter 'cg-COT-SharingOffset-r16' indicating X number of symbol(s) for downlink transmission, and the base station may allow X number of symbol(s) for shared channel occupancy for downlink transmission. Here, the X number of symbol(s) represent X number of symbol(s) from an end of slot n (slot #n) in which the base station has detected CG-UCI.

Here, downlink transmission of the base station may be performed after uplink transmission of the user equipment, wherein a length of the downlink transmission may be limited to up to 2 symbols, 4 symbols, or 8 symbols according to a subcarrier spacing. The downlink transmission may be limited to up to 2 symbols when the subcarrier spacing is 15 KHz, up to 4 symbols when the subcarrier spacing is 30 KHz, and up to 8 symbols when the subcarrier spacing is 60 KHz.

Hereinafter, downlink transmission performed by the base station after uplink transmission of the user equipment will be described. Here, the downlink transmission performed by the base station may correspond to both the case where the base station has transmitted (configured) an RRC parameter for the threshold of ED to the user equipment and the case where the base station has not transmitted (configured) the same.

i) When the base station has configured the threshold of ED by configuring, for the user equipment, 'ULtoDL-CO-SharingED-Threshold-r16' as an RRC parameter for the threshold of ED, the base station may perform downlink transmission including only DRS after the user equipment performs uplink (e.g., PUSCH) transmission on a scheduled or configured resource. In the present specification, DRS may include at least one SSB including a primary synchronization signal (PSS), secondary synchronization signal (SSS), physical broadcast channel (PBCH), and DR-RS for PBCH. Furthermore, DRS may include CORESET for PDSCH that carries system information block 1 (SIB1) and PDCCH for scheduling the same. Furthermore, DRS may include non-zero power CSI reference signals.

Meanwhile, when the threshold of ED has not been configured since the base station has not configured, for the user equipment, 'ULtoDL-CO-SharingED-Threshold-r16' as an RRC parameter for the threshold of ED, the downlink transmission including only DRS may be performed only when the subcarrier spacing is at least 30 KHz. This is because the number of symbols occupied by SSB included in DRS is at least 4.

ii) The base station may perform downlink transmission including DRS after the user equipment performs uplink (e.g., PUSCH) transmission on a scheduled or configured resource. Here, in the downlink transmission of the base station, non-unicast transmission for any user equipment may be multiplexed.

iii) The base station may perform downlink transmission after the user equipment performs uplink (e.g., PUSCH) transmission on a scheduled or configured resource. Here, the downlink transmission performed by the base station may include a reference signal (e.g., CSI-RS, tracking RS, etc.) for the user equipment that has initiated channel occupancy and non-unicast transmission for any user equipment.

iv) The base station may perform downlink transmission after the user equipment performs uplink (e.g., PUSCH) transmission on a scheduled or configured resource. Here, the downlink transmission performed by the base station may not include user plane data for the user equipment that has initiated channel occupancy, but may include unicast transmission including control plane data (e.g., data for RRC configuration) and non-unicast for any user equipment.

When channel occupancy initiated by the user equipment is shared with the base station, the base station may perform, after uplink transmission performed by the user equipment, channel access based on a specific gap or a gap smaller than the specific gap and perform the downlink transmission of above i) to iv). Hereinafter, a channel access procedure of the base station will be described.

When the gap is less than 16 μs, the base station may perform downlink transmission after performing a type 2C downlink channel access procedure. The type 2C downlink channel access procedure indicates that the base station performs downlink transmission without performing channel sensing before performing downlink transmission. The duration for downlink transmission may be limited to up to 584 μs (refer to 3GPP TS37.213).

---

4.1.2.3 Type 2C DL channel access procedures

When a gNB follows the procedures in this subclause for transmission of a DL transmission, the gNB does not sense the channel before transmission of the DL transmission. The duration of the corresponding DL transmission is at most 584 us.

---

When the gap is 16 μs, the base station may perform downlink transmission after performing a type 2B downlink channel access procedure. The type 2B downlink channel access procedure indicates that the base station performs downlink transmission immediately after sensing whether a channel within the duration of 16 μs (T_f) is idle before performing downlink transmission. 16 μs (T_f) may include one sensing slot within last 9 μs of 16 μs. When a channel is sensed as being idle during an entire interval (e.g., at least 5 μs) including an interval (e.g., at least 4 μs) in which sensing is performed in a sensing slot, the channel may be considered to be idle (see 3GPP TS37.213).

---

4.1.2.2 Type 2B DL channel access procedures

A gNB may transmit a DL transmission immediately after sensing the channel to be idle within a duration of $T_f = 16$ us. $T_f$ includes a sensing slot that occurs within the last 9 us of $T_f$. The channel is considered to be idle within the duration $T_f$ if the channel is sensed to be idle for a total of at least 5 us with at least 4 us of sensing occurring in the sensing slot.

---

When the gap is 25 μs, the base station may perform downlink transmission after performing a type 2A downlink channel access procedure. The type 2A downlink channel access procedure indicates that the base station performs downlink transmission immediately after sensing whether a channel is idle during a sensing interval of 25 μs (T_short_dl) before performing downlink transmission. The sensing interval of (T_short_dl) may be configured with a 16 μs (T_f) interval and one sensing slot (9 μs) immediately after the 16 μs (T_f) interval. The 16 μs (T_f) interval may include one sensing slot (9 μs). When a sensing interval of 25 μs (T_short_dl) (i.e., entire sensing slot) is sensed as being idle, the channel may be considered to be idle during the interval of 25 μs (T_short_dl) (see 3GPP TS37.213).

---

4.1.2.1 Type 2A DL channel access procedures

An eNB/gNB may transmit a DL transmission immediately after sensing the channel to be idle for at least a sensing interval $T_{short\_dl} = 25$ us. $T_{short\_dl}$ consists of a duration $T_f = 16$ us immediately followed by one sensing slot and $T_f$ includes a sensing slot at start of $T_f$. The channel is considered to be idle for $T_{short\_dl}$ if both sensing slots of $T_{short\_dl}$ are sensed to be idle.

---

Figure 16:
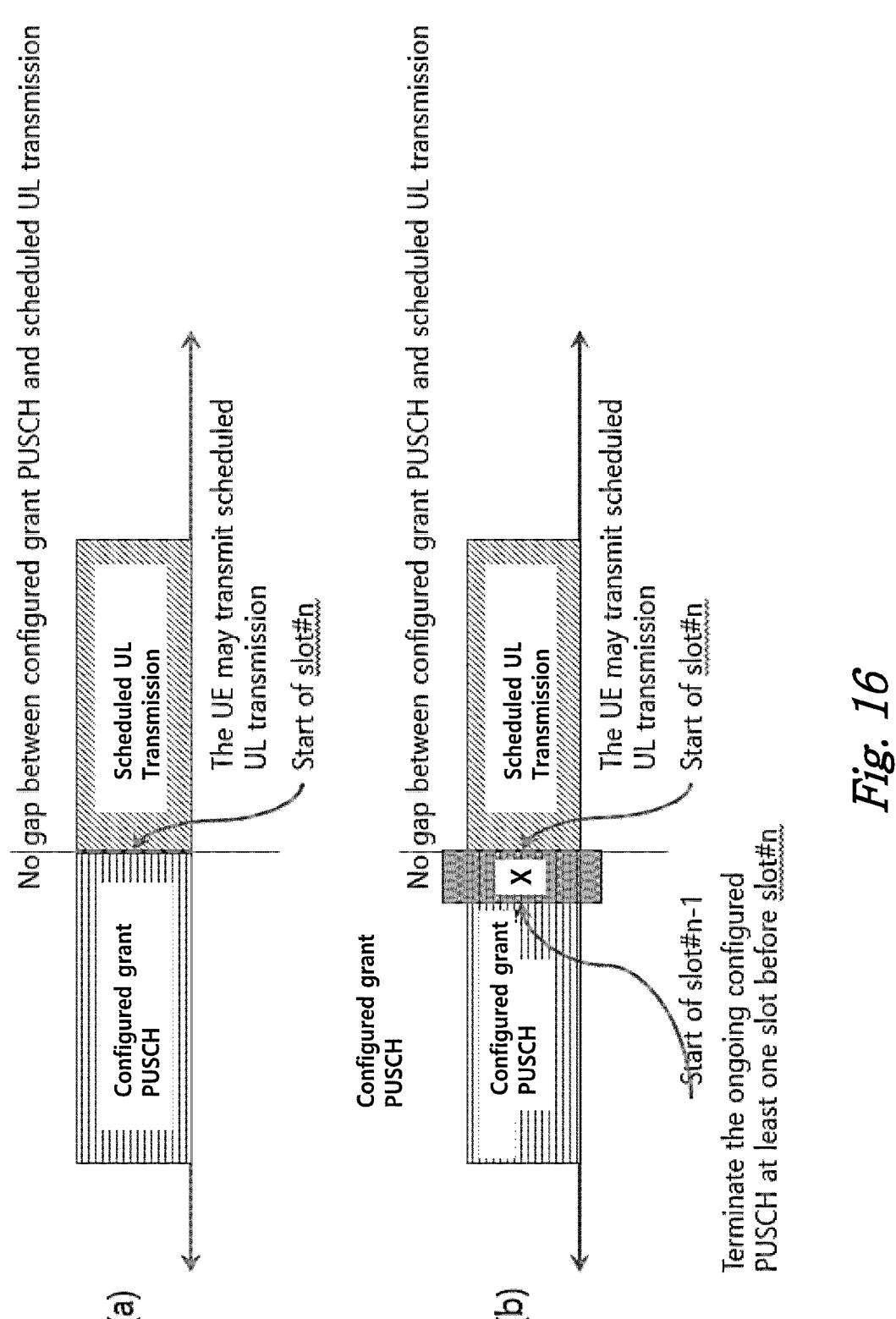
FIG. 16 is a diagram illustrating scheduled uplink transmission according to an embodiment of the present invention.

FIG. 16 is a diagram illustrating scheduled uplink transmission according to an embodiment of the present invention.

In detail, FIG. 16 illustrates that when the user equipment is scheduled from the base station so as to perform uplink transmission continuously without a gap after a resource configured for autonomous transmission or CG-PUSCH, the user equipment performs scheduled uplink transmission.

When the user equipment is configured to perform the scheduled uplink transmission, the user equipment may perform the scheduled uplink transmission without performing channel access when the following conditions are satisfied. Uplink transmission on a resource configured for autonomous transmission or CG-PUSCH may be dropped at a last symbol of a slot (e.g., (n−1)-th slot) prior to a starting time of a slot (e.g., n-th slot) for scheduled uplink transmission.

Hereinafter, conditions for the user equipment to perform scheduled uplink transmission without performing channel access will be described.

a) The user equipment should perform category 4 channel access (e.g., type 1 uplink channel access) for uplink transmission on a resource configured for autonomous transmission or CG-PUSCH. Furthermore, the user equipment should perform uplink transmission on a resource configured for autonomous transmission or CG-PUSCH prior to a starting time of scheduled uplink transmission.

b) For a resource of a frequency domain for scheduled uplink transmission, all resource blocks (RBs) of an LBT bandwidth (e.g., 20 MHz) that may be occupied by a slot scheduled first among time domain resources configured for scheduled uplink transmission should be scheduled. Alternatively, all RBs of an uplink bandwidth part (BWP) configured for the user equipment should be scheduled. Here, a starting symbol index of the slot scheduled first among the time domain resources configured for CG-PUSCH may be 0. Alternatively, a plurality of LBT bandwidths may be present within one BWP. Here, a resource for autonomous transmission or a resource configured for CG-PUSCH is allocated to at least one LBT bandwidth within one BWP, a resource of a frequency domain for scheduled uplink transmission may occupy all RBs of a subset of one of the at least one LBT bandwidth or occupy all RBs of all LBT bandwidths in which the resource for autonomous transmission or the resource configured for CG-PUSCH is included.

c) The CAPC used by the user equipment when performing category 4 channel access (e.g., type 1 uplink channel access) for uplink transmission on a resource configured for autonomous transmission or CG-PUSCH should be larger than or equal to the CAPC indicated by the base station for scheduled uplink transmission.

d) A sum of a length of uplink transmission on a resource configured for autonomous transmission or CG-PUSCH and a length of scheduled uplink transmission should not exceed a maximum channel occupancy time (MCOT). Here, the MCOT is one configured when the user equipment performs category 4 channel access (e.g., type 1 uplink channel access) for uplink transmission on a resource configured for autonomous transmission or CG-PUSCH.

When all of the above conditions of a) to d) are not satisfied, uplink transmission on a resource configured for autonomous transmission or CG-PUSCH may be dropped at a last symbol of a slot (e.g., (n−1)-th slot) prior to a starting time of a slot (e.g., n-th slot) for scheduled uplink transmission. Alternatively, the user equipment may drop uplink transmission on a resource configured for autonomous transmission or CG-PUSCH at a slot (e.g., (n−1)-th slot) that precedes a starting time of a slot (e.g., n-th slot) for scheduled uplink transmission by as much as at least one slot. Meanwhile, when a time (cancellation guaranteed time) during which uplink transmission is allowed to be dropped has not elapsed, the user equipment may drop uplink transmission on a resource configured for autonomous transmission or CG-PUSCH at a slot (e.g., (n−1)-th slot) that precedes a starting time of a slot (e.g., n-th slot) for scheduled uplink transmission by as much as at least one slot. However, the time during which uplink transmission is allowed to be dropped has elapsed, the user equipment may perform scheduled uplink transmission at a next slot (e.g., (n+1)-th slot) after a starting time of a slot (e.g., n-th slot) for scheduled uplink transmission. Here, in a channel access procedure for performing scheduled uplink transmission at the next slot (e.g., (n+1)-th slot), category 4 channel access (e.g., type 1 uplink channel access) may be used. Alternatively, when a resource for scheduled uplink transmission is included within MCOT configured when the user equipment performs the category 4 channel access (e.g., type 1 uplink channel access) for uplink transmission on a resource configured for autonomous transmission or CG-PUSCH, the user equipment may perform scheduled uplink transmission based on category 2 channel access (e.g., type 2A uplink channel access).

When the user equipment has been scheduled from the base station to perform uplink transmission continuously without a gap after a resource configured for autonomous transmission or CG-PUSCH, the user equipment may perform scheduled uplink transmission without channel access according to the type of scheduled uplink transmission. The type of scheduled uplink transmission may include PUSCH including uplink-shared channel (UL-SCH), PUSCH not including UL-SCH, PUCCH for transmitting uplink control information, uplink transmission (e.g., PRACH preamble, Msg3) related to a random access procedure, sounding reference signal (SRS), etc. Here, PUCCH may include HARQ-ACK, scheduling request (SR), beam-failure recovery request (BFR), or channel state information (CSI).

When the above conditions of a) to d) are satisfied, the user equipment may perform scheduled uplink transmission without performing channel access (e.g., LBT) regardless of the type of scheduled uplink transmission.

When scheduled uplink transmission is uplink transmission excluding PUSCH and the above conditions of a), c), and d) are satisfied, the user equipment may perform scheduled uplink transmission without performing channel access.

When scheduled uplink transmission is uplink transmission excluding PUSCH including UL-SCH and the above conditions of a), c), and d) are satisfied, the user equipment may perform scheduled uplink transmission without performing channel access.

Scheduled uplink transmission may be PUCCH including at least one of HARQ-ACK, SR, or BFR. Here, when PUCCH transmission has been scheduled by being spread to an LBT bandwidth by configuring, by means of RRC, interlaced-PUCCH transmission for PUCCH transmission, the user equipment may perform scheduled PUCCH transmission without performing channel access if the above conditions of a), c), and d) are satisfied. This is for guaranteeing transmission on a scheduled resource as much as possible since latency due to a link failure may significantly increase or a data transfer rate of uplink/downlink transmission may decrease due to a failure in a channel access procedure in the case of PUCCH including at least one of HARQ-ACK, SR, or BFR. Furthermore, CAPC used for PUCCH transmission may be typically set to 1. Therefore, CAPC used for PUCCH transmission may be always smaller than or equal to CAPC used by the user equipment when performing category 4 channel access (e.g., type 1 uplink channel access) for uplink transmission on a resource configured for autonomous transmission or CG-PUSCH, and thus the above condition of c) may be satisfied.

When scheduled uplink transmission is SRS not including PUSCH, PUCCH, PUSCH not including UL-SCH, and transmission related to a random access procedure (e.g., PRACH preamble, Msg3), the user equipment may perform scheduled uplink transmission without performing a channel access procedure if the above conditions of a), c, and d) are satisfied. Here, for the SRS not including PUSCH, PUCCH, PUSCH not including UL-SCH, and transmission related to a random access procedure (e.g., PRACH preamble, Msg3), a category 4 channel access (e.g., type 1 uplink channel access) procedure may be performed, and, at this time, CAPC may be set to 1.

Figure 17:
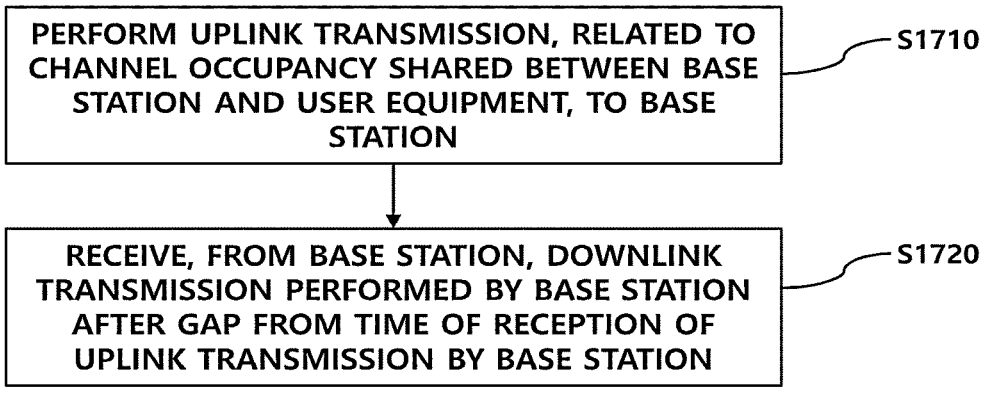
FIG. 17 is a flowchart illustrating a method for a user equipment to receive downlink transmission according to an embodiment of the present invention.

FIG. 17 is a flowchart illustrating a method for a user equipment to receive downlink transmission according to an embodiment of the present invention.

The method for the user equipment to receive downlink transmission will be described with reference to FIG. 17.

The user equipment performs uplink transmission, related to channel occupancy shared between the base station and the user equipment, to the base station (S1710).

The user equipment receives downlink transmission performed by the base station after a gap from a reception time of the uplink transmission (S1720).

The downlink transmission may be performed based on channel access performed by the base station, wherein the channel access may be performed based on the gap.

Information included in the downlink transmission and a resource on which the downlink transmission is performed may be determined according to whether the user equipment has received a configuration of the threshold of energy detection from the base station.

Here, the gap may be less than 16 μs, 16 μs, or 25 μs. When the gap is less than 16 μs, the channel access may be channel access that allows the downlink transmission to be performed without performing channel sensing, i.e., the above-described type 2C downlink channel access. When the gap is 16 μs, the gap includes one sensing slot within last 9 μs, and the channel access may be channel access that allows the downlink transmission to be performed when the sensing slot is idle, i.e., the above-described type 2B downlink channel access. When the gap is 25 μs, the gap is configured with a first interval of a length of 16 μs including a first sensing slot of a length of 9 μs and a second interval of a length of 9 μs that is a second sensing slot, and the channel access may be channel access that allows the downlink transmission to be performed when the first sensing slot and the second sensing slot are idle, i.e., the above-described type 2A downlink channel access. When the user equipment has received, from the base station, a configuration of the threshold of energy detection for the channel occupancy, the information included in the downlink transmission may include at least one of unicast transmission for the user equipment that has initiated the channel occupancy or non-unicast transmission for any user equipment. Meanwhile, when the user equipment has not received, from the base station, a configuration of the threshold of energy detection for the channel occupancy, the information included in the downlink transmission excludes unicast transmission, and the maximum number of symbols of a resource on which the downlink transmission is performed within the channel occupancy interval may be any one of 2, 4, and 8. When the subcarrier spacing (SCS) is 15 KHz, the resource on which the downlink transmission is performed within the channel occupancy interval may include up to two symbols. When the SCS is 30 KHz, the resource on which the downlink transmission is performed within the channel occupancy interval may include up to four symbols. When the SCS is 60 KHz, the resource on which the downlink transmission is performed within the channel occupancy interval may include up to eight symbols.

The uplink transmission performed by the user equipment may be configured grant (CG)-physical uplink shared channel (PUSCH) performed on a resource pre-configured semi-statically from the base station. Here, when the user equipment has received, from the base station, a configuration of the threshold of energy detection for the channel occupancy, the user equipment may receive, from the base station, a configuration of information about a table including values set for each of one or more parameters for the channel occupancy and one or more indices corresponding to the set values. The CG-PUSCH may include CG-uplink control information (UCI) including information indicating a first index among the one or more indices. The downlink transmission may be performed based on the values set for each of one or more parameters corresponding to the first index. The one or more parameters may be at least one of channel access priority (CAPC), duration, or offset. The CAPC may be one used in channel occupancy initiated by the user equipment, the duration may represent the number of slots that are available (assumable) in the downlink transmission within a time of channel occupancy initiated by the user equipment, and the offset may represent a difference from an end of a slot in which the base station has detected the CG-UCI to a slot in which the downlink transmission is started. Meanwhile, when the user equipment has not received, from the base station, a configuration of the threshold of energy detection for the channel occupancy, the user equipment may receive, from the base station, an offset for indicating a resource (symbol) that is available (allowable for the downlink transmission) for the downlink transmission. The CG-PUSCH may include CG-UCI including information indicating that the channel occupancy is possible, and the downlink transmission may be performed on resources between a last resource of a slot in which the base station has detected CG-UCI and a resource spaced apart therefrom by as much as the offset. Here, the information included in the downlink transmission excludes unicast transmission, and the maximum number of symbols of a resource on which the downlink transmission is performed within the channel occupancy interval may be any one of 2, 4, and 8. When the subcarrier spacing (SCS) is 15 KHz, the resource on which the downlink transmission is performed within the channel occupancy interval may include up to two symbols. When the SCS is 30 KHz, the resource on which the downlink transmission is performed within the channel occupancy interval may include up to four symbols. When the SCS is 60 KHz, the resource on which the downlink transmission is performed within the channel occupancy interval may include up to eight symbols.

The user equipment, which performs the method for receiving downlink transmission transmitted from the base station described with reference to FIG. 17, may be the user equipment described above with reference to FIG. 14. In detail, the user equipment may include a communication module for transmitting/receiving a wireless signal and a processor that controls the communication module. Here, the method for receiving downlink transmission described with reference to FIG. 17 may be performed through the processor. Here, similarly, the base station may be the base station described above with reference to FIG. 14. The base station may also include a communication module for transmitting/receiving a wireless signal and a processor that controls the communication module.

Figure 18:
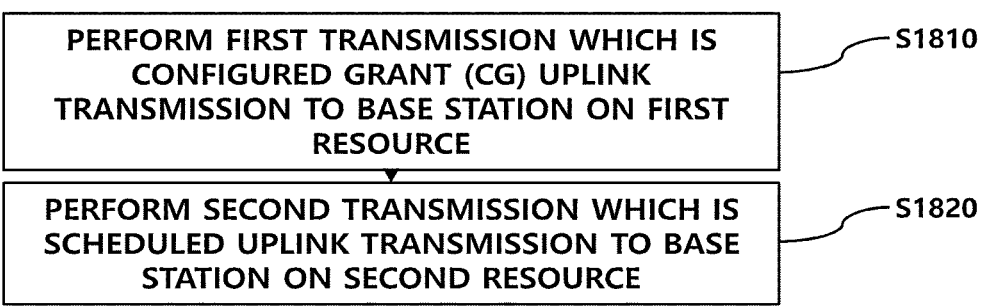
FIG. 18 is a flowchart illustrating a method for a user equipment to perform uplink transmission according to an embodiment of the present invention.

FIG. 18 is a flowchart illustrating a method for a user equipment to perform uplink transmission according to an embodiment of the present invention.

The method for the above-described user equipment to perform uplink transmission will be described with reference to FIG. 18.

The user equipment performs first transmission that is configured grant (CG) uplink transmission to the base station on a first resource (S1810).

Here, the CG uplink transmission may be transmission performed on a resource pre-configured semi-statically from the base station.

The user equipment performs second transmission that is scheduled uplink transmission to the base station on a second resource (S1820).

The first resource and the second resource may be continuous to each other in a time domain.

When at least one pre-configured condition is satisfied, the second transmission may be performed on the second resource immediately after a last symbol of the first resource.

When the at least one pre-configured condition is not satisfied, the first transmission may be dropped at the last symbol of the first resource.

One of the at least one pre-configured condition may be a condition that the first transmission be performed based on channel access in which random backoff is performed using a contention window (CW) of a variable size, i.e., the above-described category 4 channel access.

One of the at least one pre-configured condition may be a condition that a resource allocated for the second transmission occupy all resource blocks (RBs) of the same frequency domain as a frequency domain of a resource allocated for the first transmission.

One of the at least one pre-configured condition may be a condition that when a bandwidth part (BWP) that is a resource in a frequency domain allocated for the first transmission is configured with a plurality of listen before talk (LBT) bandwidth subsets, a resource allocated for the second transmission occupy all resource blocks (RBs) included in at least one of the plurality of LBT bandwidth subsets.

One of the at least one pre-configured condition may be a condition that the second transmission be performed based on a second channel access priority class (CAPC) value that is smaller than or equal to a first CAPC value used in the channel access.

One of the at least one pre-configured condition may be a condition that a sum of a time domain of the first resource and a time domain of the second resource not exceed a maximum channel occupancy time (MCOT) corresponding to the first CAPC value.

The user equipment, which performs the uplink transmission described with reference to FIG. 18, may be the user equipment described above with reference to FIG. 14. In detail, the user equipment may include a communication module for transmitting/receiving a wireless signal and a processor that controls the communication module. Here, the method for receiving downlink transmission described with reference to FIG. 18 may be performed through the processor. Here, similarly, the base station may be the base station described above with reference to FIG. 14. The base station may also include a communication module for transmitting/receiving a wireless signal and a processor that controls the communication module.

The method and system of the present invention is described with reference to specific embodiments, but some or all of the components or the operations may be implemented using a computer system having a general-purpose hardware architecture.

The above description of the present invention is merely illustrative, and it would be easily understood that those of ordinary skill in the art could easily make modifications without departing from the technical concept of the present invention or changing essential features. Therefore, the above embodiments should be considered illustrative and should not be construed as limiting. For example, each component described as a single type may be distributed, and likewise, components described as being distributed may be implemented as a combined form.

The scope of the present invention is indicated by the following claims rather than the detailed description, and it should be construed that all changes or modifications derived from the meaning and scope of the claims and their equivalents are included in the scope of the present invention.

What is claimed is:

1. A method for use by a user equipment in a wireless communication system, the method comprising:

performing a first transmission that is a configured grant (CG) uplink transmission on a first resource, wherein the first resource is configured with a plurality of Listen Before Talk (LBT) bandwidth subsets; and performing a second transmission that is a scheduled uplink transmission on a second resource, wherein the first transmission is performed according to a channel access in which random backoff is performed by using a contention window (CW) of a variable size, when conditions are satisfied, the second transmission is performed on the second resource immediately after a last symbol for the first transmission, when the conditions are not satisfied, the first transmission is dropped before a start symbol of the second resource, and wherein the conditions include a case that the second transmission occupies all resource blocks (RBs) included in a LBT bandwidth subset among the plurality of LBT bandwidth subsets.

2. The method of claim 1, wherein the conditions further include that the second transmission is performed based on a second channel access priority class (CAPC) value that is smaller than or equal to a first CAPC value used in the channel access procedure.

3. The method of claim 2, wherein the conditions further include that a sum of transmission durations of the first resource and the second resource in a time domain does not exceed a maximum channel occupancy time (MCOT) corresponding to the first CAPC value.

4. The method of claim 1, wherein the CG uplink transmission is performed on a resource pre-configured semi-statically.

5. A user equipment configured to operate in a wireless communication system, the user equipment comprising:

a communication module; and a processor that controls the communication module, wherein the processor is configured to:

perform a first transmission that is a configured grant (CG) uplink transmission on a first resource, wherein the first resource is configured with a plurality of Listen Before Talk (LBT) bandwidth subsets, perform a second transmission that is a scheduled uplink transmission on a second resource, wherein the first transmission is performed according to a channel access in which random backoff is performed by using a contention window (CW) of a variable size, when conditions are satisfied, the second transmission is performed on the second resource immediately after a last symbol for the first transmission, when the conditions are not satisfied, the first transmission is dropped before a start symbol of the second resource, and wherein the conditions include a case that the second transmission occupies all resource blocks (RBs) included in a LBT bandwidth subset among the plurality of LBT bandwidth subsets.

6. The user equipment of claim 5, wherein the conditions further include that the second transmission is performed based on a second channel access priority class (CAPC) value that is smaller than or equal to a first CAPC value used in the channel access procedure.

7. The user equipment of claim 6, wherein the conditions further include that a sum of transmission durations of the first resource and the second in a time domain resource does not exceed a maximum channel occupancy time (MCOT) corresponding to the first CAPC value.

8. The user equipment of claim 5, wherein the processor is configured to perform the CG uplink transmission on a resource pre-configured semi-statically.

9. A method for use by a base station in a wireless communication system, the method comprising:

receiving a first transmission that is a configured grant (CG) uplink transmission transmitted on a first resource, wherein the first resource is configured with a plurality of Listen Before Talk (LBT) bandwidth subsets; and receiving a second transmission that is scheduled uplink transmission transmitted on a second resource, wherein the first transmission is performed according to a channel access in which random backoff is performed using a contention window (CW) of a variable size, when conditions are satisfied, the second transmission is performed on the second resource immediately after a last symbol for the first transmission, when the conditions are not satisfied, the first transmission is dropped before a start symbol of the second resource, and wherein the conditions include a case that the second transmission occupies all resource blocks (RBs) included in a LBT bandwidth subset among the plurality of LBT bandwidth subsets.

10. The method of claim 9, wherein the conditions further include that the second transmission is performed based on a second channel access priority class (CAPC) value that is smaller than or equal to a first CAPC value used in the channel access procedure.

11. The method of claim 10, wherein the conditions further include that a sum of transmission durations of the first resource and the second resource in a time domain does not exceed a maximum channel occupancy time (MCOT) corresponding to the first CAPC value.

12. The method of claim 9, wherein the CG uplink transmission is performed on a resource pre-configured semi-statically.

\*    \*    \*    \*    \*